US010573198B2

(12) United States Patent
Oguchi et al.

(10) Patent No.: US 10,573,198 B2
(45) Date of Patent: Feb. 25, 2020

(54) VIDEO PLAYBACK DEVICE AND METHOD

(71) Applicant: RUN.EDGE LIMITED, Tokyo (JP)

(72) Inventors: Atsushi Oguchi, Kawasaki (JP);
Masahiro Kihara, Fukuoka (JP);
Shunsuke Kobayashi, Fukuoka (JP);
Kazumi Doi, Fukuoka (JP)

(73) Assignee: RUN EDGE LIMITED, Tokyo (JP)

( * ) Notice: Subject to any disclaimer, the term of this patent is extended or adjusted under 35 U.S.C. 154(b) by 0 days.

(21) Appl. No.: 15/214,910

(22) Filed: Jul. 20, 2016

(65) Prior Publication Data

US 2017/0025038 A1    Jan. 26, 2017

(30) Foreign Application Priority Data

Jul. 22, 2015 (JP) .................. 2015-145348

(51) Int. Cl.
| H04N 5/775 | (2006.01) |
| G09B 19/00 | (2006.01) |
| H04N 21/4402 | (2011.01) |
| H04N 21/472 | (2011.01) |
| G09B 5/06 | (2006.01) |

(52) U.S. Cl.
CPC ......... *G09B 19/0038* (2013.01); *G09B 5/065* (2013.01); *H04N 21/440263* (2013.01); *H04N 21/47217* (2013.01)

(58) Field of Classification Search
CPC ........... G09B 5/065; H04N 21/440263; H04N 21/47217
USPC ........................................ 386/230
See application file for complete search history.

(56) References Cited

U.S. PATENT DOCUMENTS

| 5,668,639 | A | * | 9/1997 | Martin | ................ | G11B 27/034 |
| | | | | | | 360/13 |
| 5,857,855 | A | | 1/1999 | Katayama | | |
| 5,947,742 | A | | 9/1999 | Katayama | | |
| 6,400,378 | B1 | * | 6/2002 | Snook | ................ | G11B 27/034 |
| | | | | | | 707/999.102 |
| 8,307,399 | B2 | * | 11/2012 | Lee | ................ | H04N 7/17318 |
| | | | | | | 715/720 |

(Continued)

FOREIGN PATENT DOCUMENTS

| CN | 101365117 A | 2/2009 |
| JP | 7-144038 A | 6/1995 |

(Continued)

OTHER PUBLICATIONS

Office Action dated Jul. 24, 2017, issued in counterpart Taiwanese Application No. 105122879, with English translation (10 pages).

(Continued)

*Primary Examiner* — Helen Shibru
(74) *Attorney, Agent, or Firm* — Westerman, Hattori, Daniels & Adrian, LLP

(57) ABSTRACT

A video playback device includes a processor that executes a procedure. The procedure includes, for plural respective videos, receiving designations of widths in a vertical direction or in a horizontal direction within display regions of the videos, and adjusting the relative display sizes between the plural videos such that the display sizes of the widths designated for the plural respective videos are equivalent.

12 Claims, 20 Drawing Sheets

(56) References Cited

U.S. PATENT DOCUMENTS

| | | | |
|---|---|---|---|
| 8,959,453 B1* | 2/2015 | Harnish | H04N 7/0122 715/719 |
| 2008/0018784 A1 | 1/2008 | Bennett | |
| 2009/0060334 A1* | 3/2009 | Rayner | G11B 27/034 382/173 |
| 2014/0123160 A1* | 5/2014 | van Coppenolle | H04L 67/30 725/5 |
| 2014/0286619 A1 | 9/2014 | Nakagome et al. | |
| 2015/0356355 A1* | 12/2015 | Oguchi | G06F 16/7837 386/230 |
| 2016/0018973 A1* | 1/2016 | Meehan | G06F 3/04847 715/719 |
| 2017/0025037 A1* | 1/2017 | Oguchi | G09B 19/0038 |
| 2018/0095656 A1* | 4/2018 | Ingah | G06F 3/04883 |

FOREIGN PATENT DOCUMENTS

| | | |
|---|---|---|
| JP | 2014-186168 A | 10/2014 |
| KR | 10-2014-0116033 A | 10/2014 |
| KR | 20140116033 A | 10/2014 |
| TW | 200820755 A | 5/2008 |

OTHER PUBLICATIONS

Office Action dated Jun. 21, 2017, issued in counterpart Korean Application No. 10-2016-0092842, with English translation (10 pages).

Office Action dated Jan. 12, 2018, issued in counterpart Korean Application No. 10-2016-0092842, with English translation (7 pages).

Office Action dated Dec. 4, 2018, issued in counterpart Japanese application No. 2015-145348, with English translation. (6 pages).

* cited by examiner

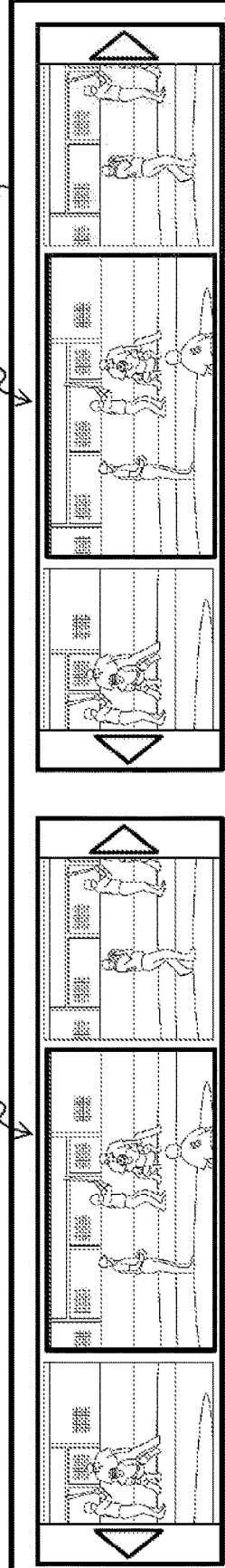
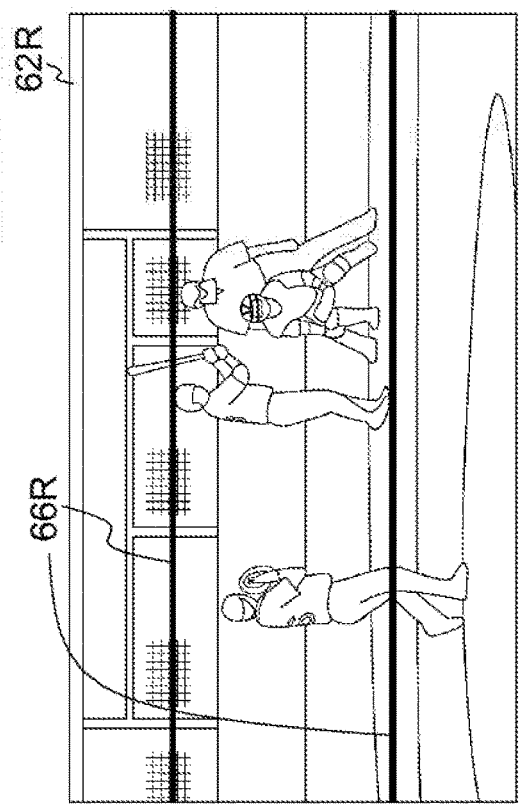
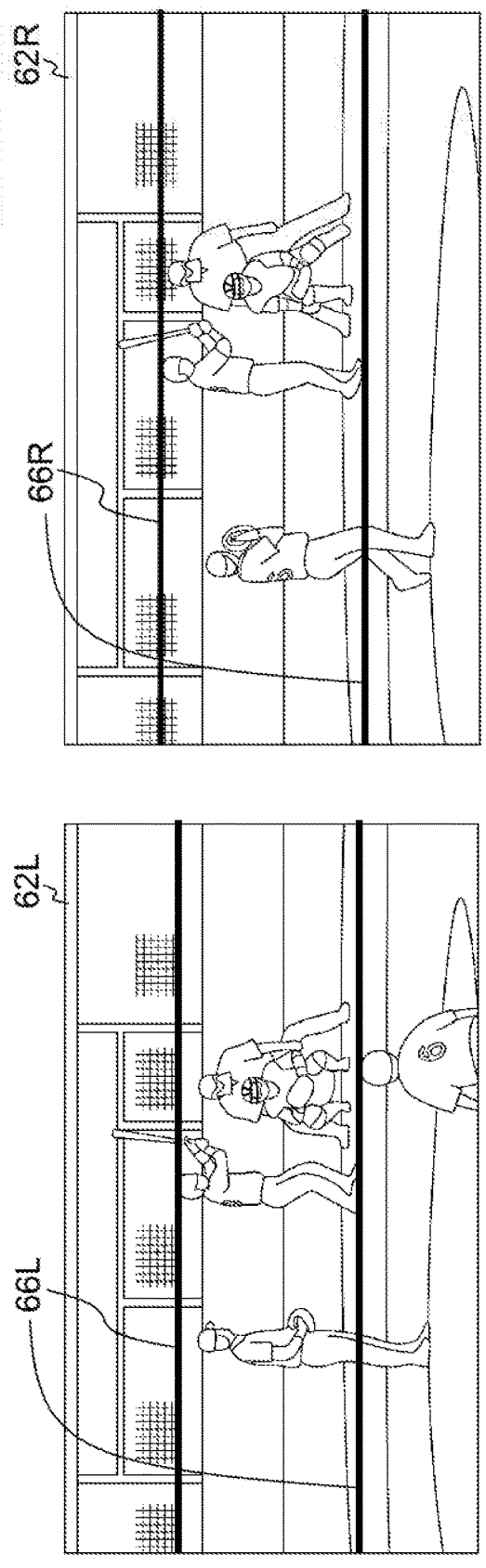
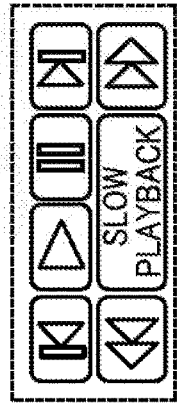
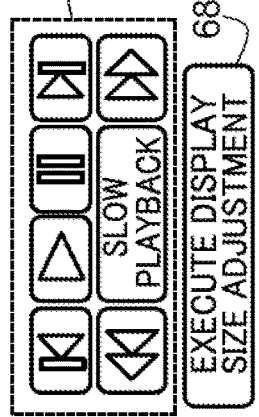
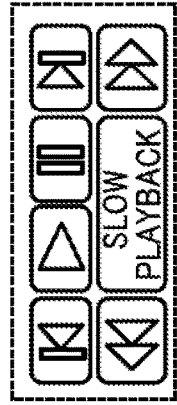
FIG.3

FIG.9
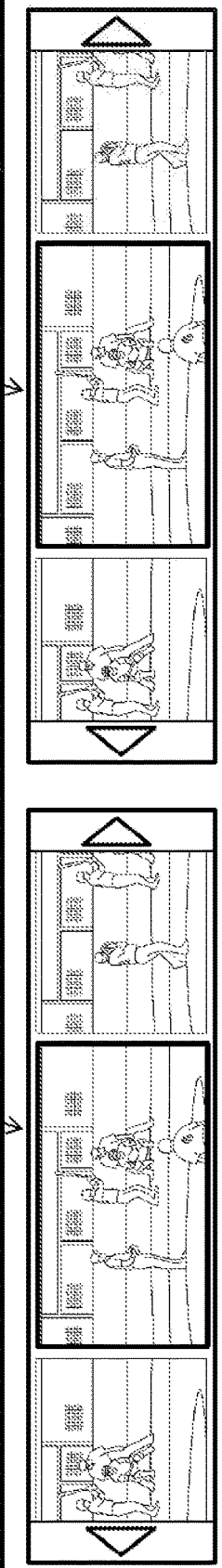
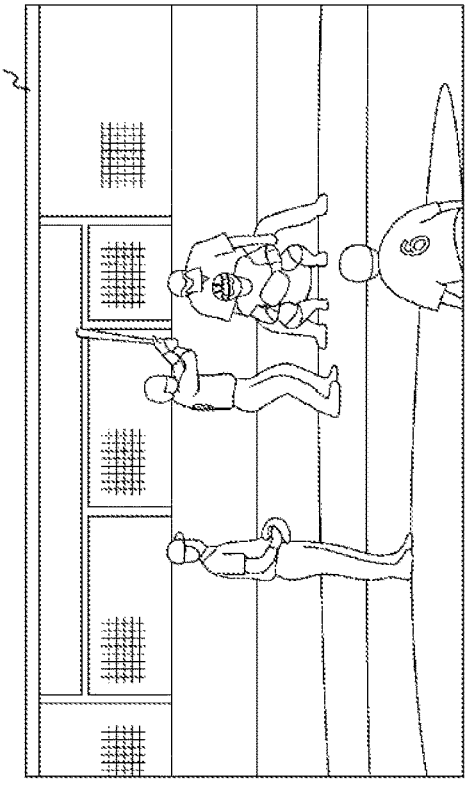
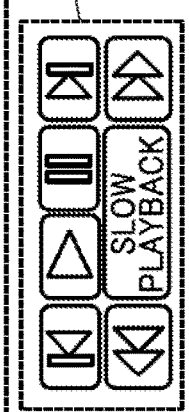
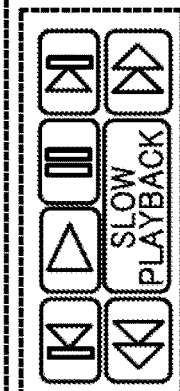
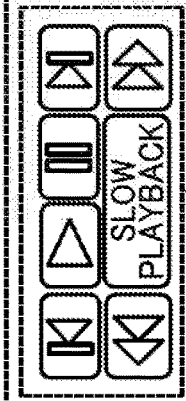

FIG.10
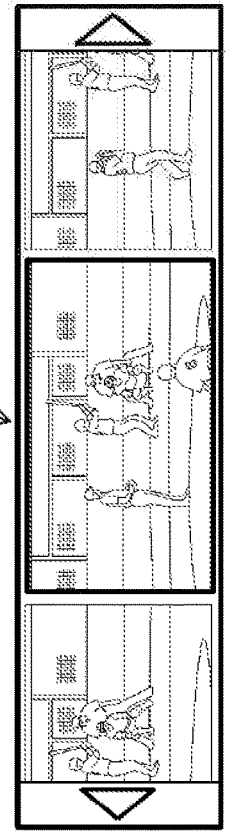
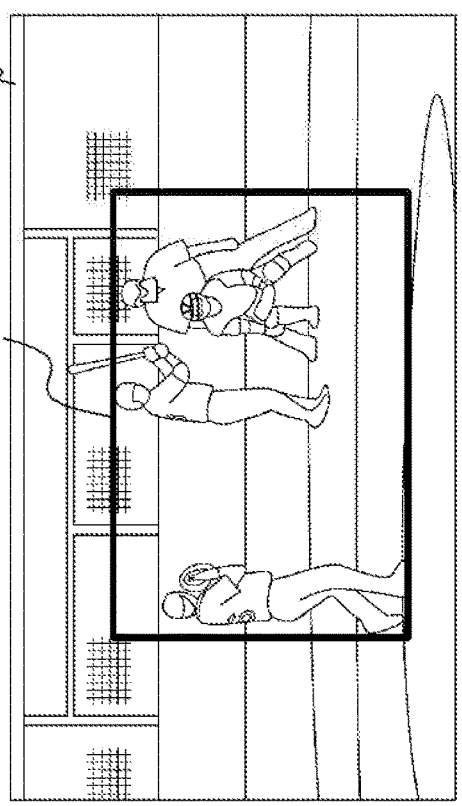
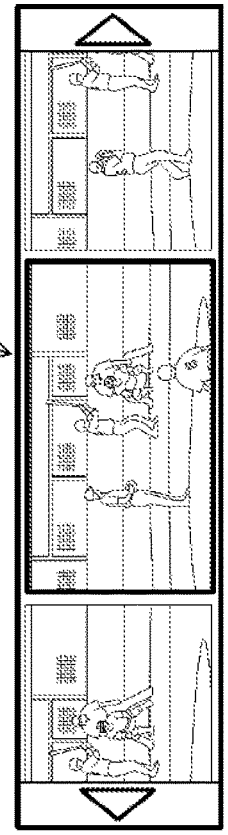
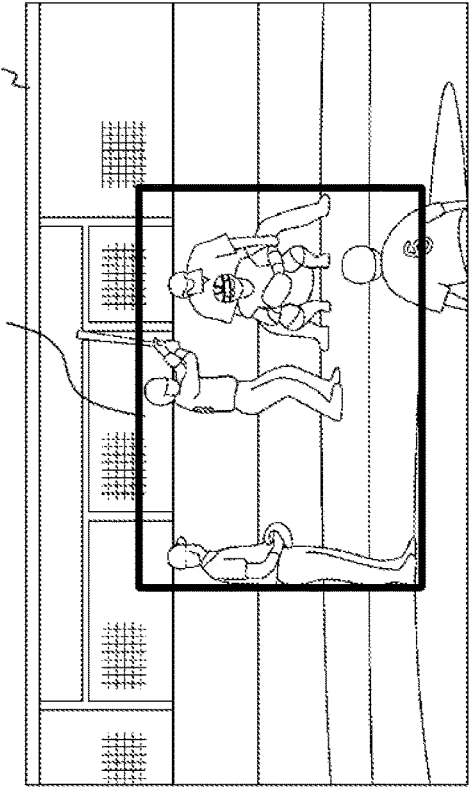
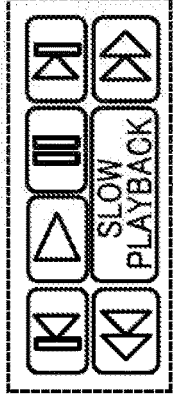
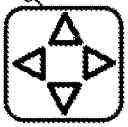
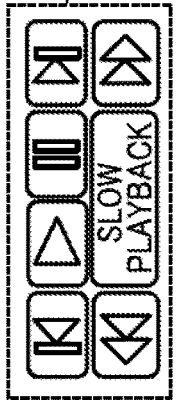
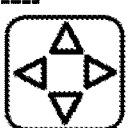
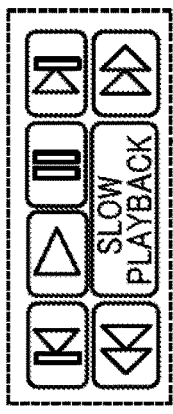

FIG.11
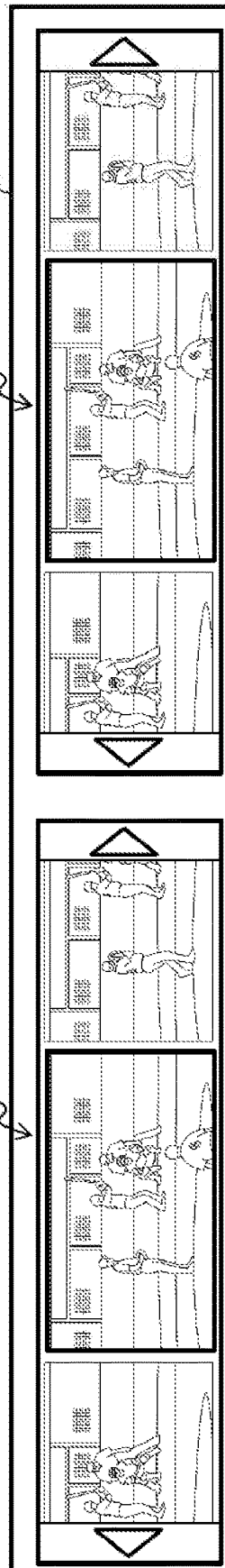
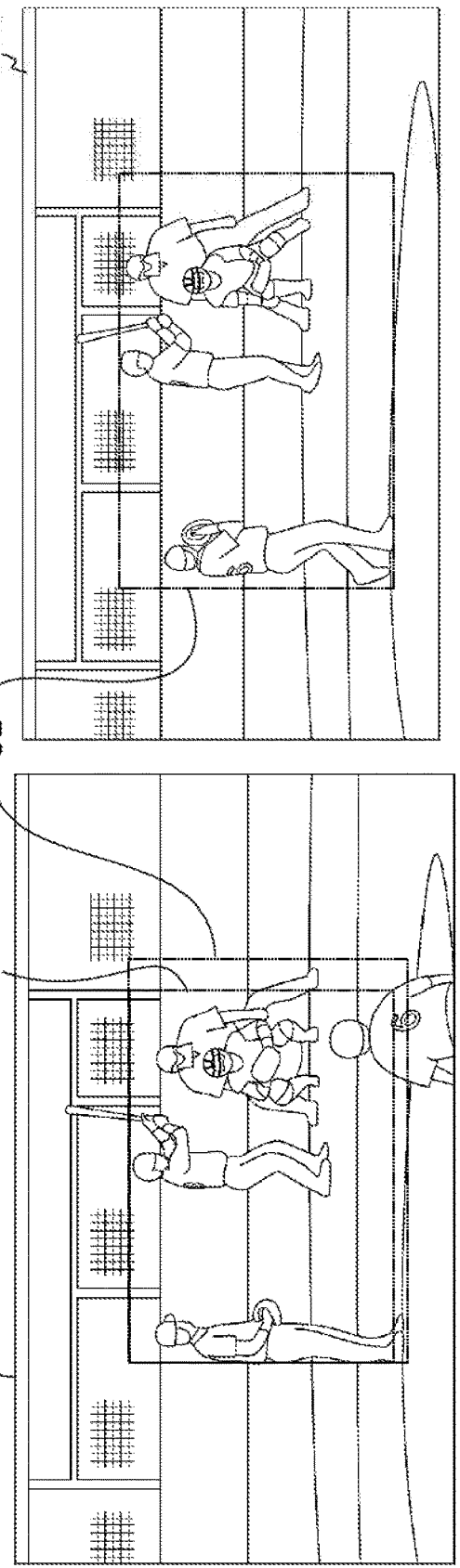
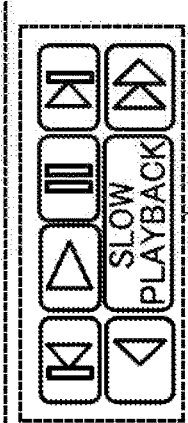
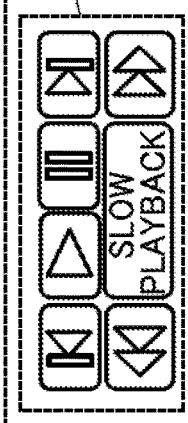
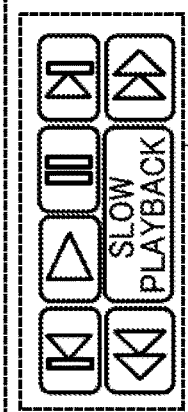

FIG.12

| USERNAME | USER-DISTINCT SHARED INFORMATION NUMBER | PLAYLIST 1 | PLAYLIST 2 | DISPLAY SIZE OF PLAYLIST 1 | DISPLAY SIZE OF PLAYLIST 2 | DISPLAY POSITION OF PLAYLIST 1 | DISPLAY POSITION OF PLAYLIST 2 |
|---|---|---|---|---|---|---|---|
| USER A | 1 | PL001 | PL002 | W1 X H1 | W2 X H2 | (x1, y1) | (x2, y2) |
| ... | | | | | | | |

332A

FIG.14
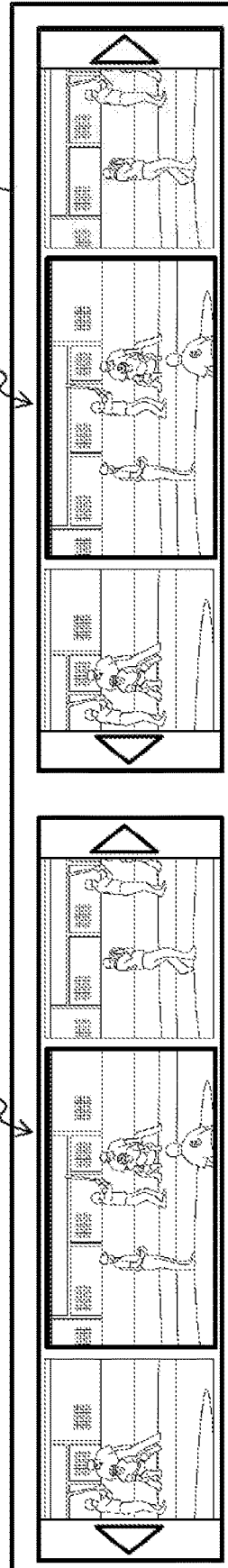
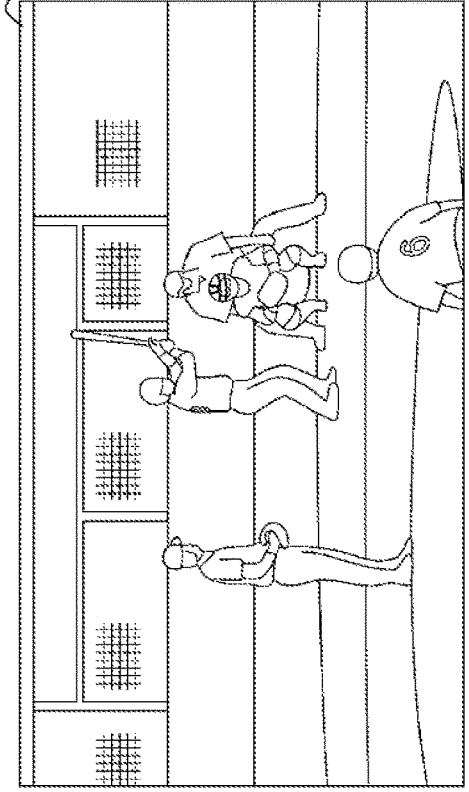
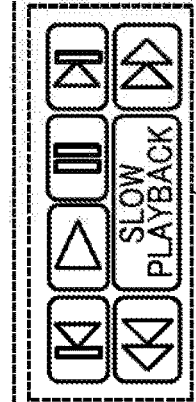
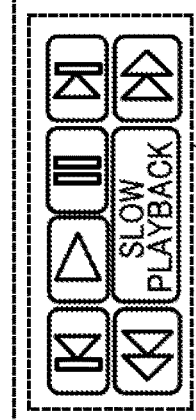

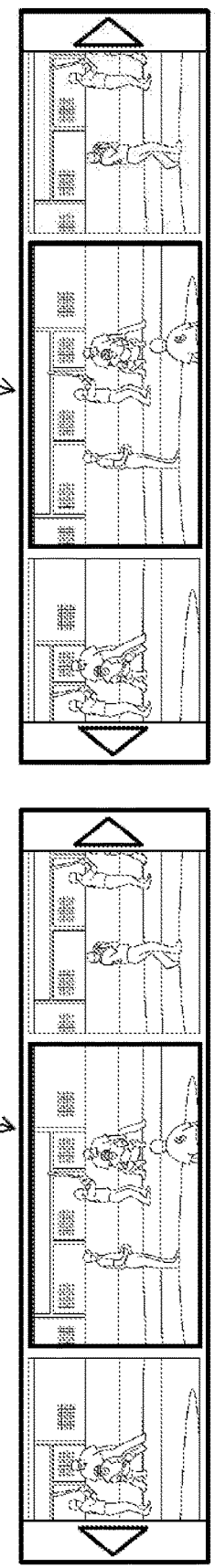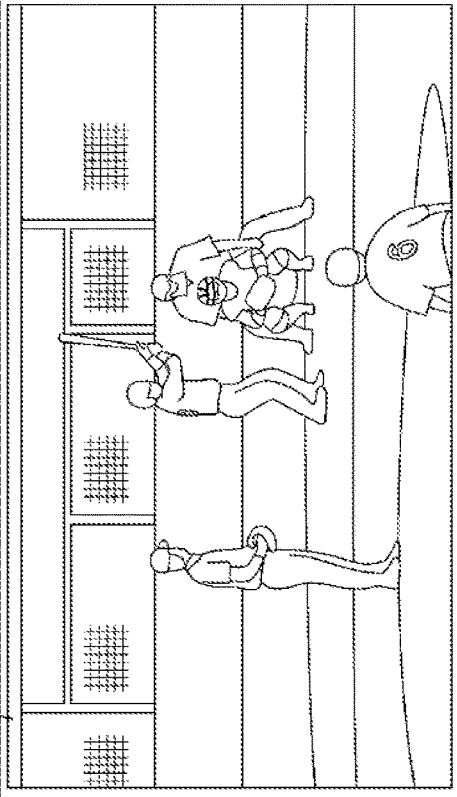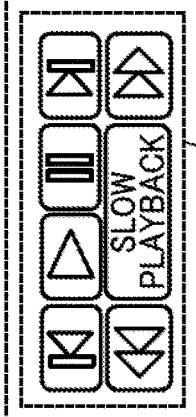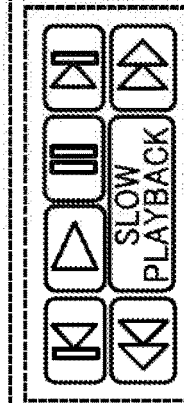
FIG.15

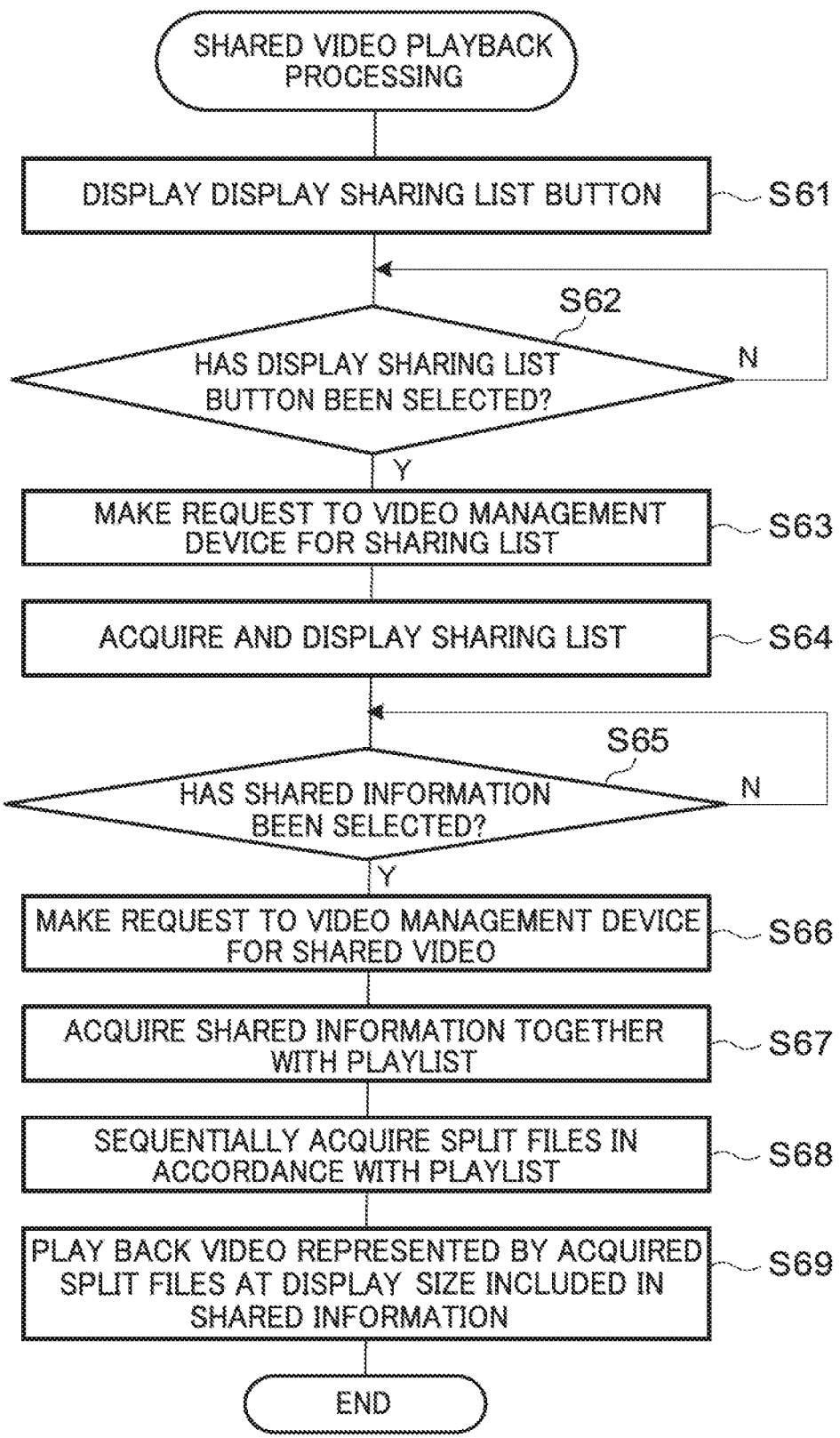

VIDEO PLAYBACK DEVICE AND METHOD

CROSS-REFERENCE TO RELATED APPLICATION

This application is based upon and claims the benefit of priority of the prior Japanese Patent Application No. 2015-145348, filed on Jul. 22, 2015, the entire contents of which are incorporated herein by reference.

FIELD

The embodiments discussed herein are related to a storage medium storing a video playback program, a video playback device, and a video playback method.

BACKGROUND

Hitherto, instruction methods have been proposed for instruction on how to move the body in sports, performances, actions, or the like that are performed by moving the body. In such methods, a sport, performance, action or the like performed by a student under instruction is captured using a video camera, and instruction is given while comparing plural video images on a screen. Moreover, the sport, performance, action or the like as performed by an instructor is compared on the same screen, so as to give the student an understanding of the correct form and timing therefor.

RELATED PATENT DOCUMENTS

Japanese Laid-Open Patent Publication No. H07-144038

SUMMARY

According to an aspect of the embodiments, a non-transitory recording medium stores a video playback program that causes a computer to execute a process. The process includes, for plural respective videos, receiving designations of widths in a vertical direction or in a horizontal direction within display regions of the videos, and adjusting the relative display sizes between the plural videos such that the display sizes of the widths designated for the plural respective videos are equivalent.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a video playback screen on which vertical width designation bars are displayed;

FIG. 9 is a diagram illustrating an example of a video playback screen of the second exemplary embodiment;

FIG. 10 is a diagram illustrating an example of a video playback screen on which a designation frame is displayed;

FIG. 11 is a diagram illustrating an e of a video playback screen with display sizes of two videos adjusted;

FIG. 12 is a diagram illustrating an example of a shared information table;

FIG. 14 is a diagram illustrating an example of a video playback screen of the third exemplary embodiment;

FIG. 15 is a diagram illustrating an example of a video playback screen on which a display sharing list button is displayed;

FIG. 21 is a flowchart illustrating an example of shared video playback processing.

DESCRIPTION OF EMBODIMENTS

Detailed explanation follows regarding an exemplary embodiment according to technology disclosed herein, with reference to the drawings.

First Exemplary Embodiment

Figure 1:
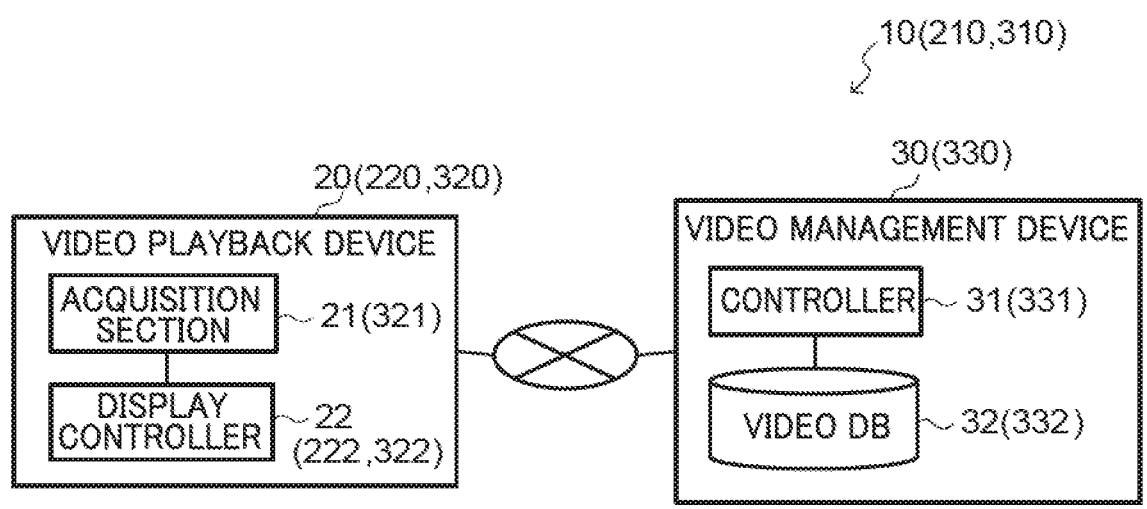
FIG. 1 is a block diagram illustrating a schematic configuration of a video playback system according to a first to a third exemplary embodiment.

As illustrated in FIG. 1, a video playback system 10 according to a first exemplary embodiment includes a video playback device 20 and a video management device 30. The video playback device 20 and the video management device 30 are connected to each other by a network.

The video management device 30 includes a controller 31 that controls distribution and the like of video data to the video playback device 20, and a video database (DB) 32 that stores plural items of video data that can be provided to users. In the present exemplary embodiment, the video data is distributed to the video playback device 20 using a method in which split files obtained by splitting a single item of video data at specific time intervals (for example, 10 seconds) are sequentially distributed using hypertext transfer protocol (HTTP). This method is a method such as HTTP live streaming (HLS), or moving picture experts group—dynamic adaptive streaming over HTTP (MPEG-DASH). A playlist describing, for example, a playback sequence for the split files is therefore also stored in the video DB 32 for each item of video data. Management information for managing identification information for example, usernames) of users to which each item of video data can be distributed is also stored in the video DB 32.

When a user logs in to a video playback application on the video playback device 20, the controller 31 receives identification information (for example, the username) of the logged-in user. The controller 31 transmits, to the video playback device 20, a playlist listing of video data items permitted for distribution to the logged-in user. The playlist listing is a listing of playlist names for respective video data permitted for distribution to the logged-in user, and in addition to the playlist names, the playlist listing may include metadata other than that of the video data, thumbnail images, and the like. Thumbnail images pre-generated from one of the frame images included in the video data may also be stored in the video DB 32, or the thumbnail images may be generated when transmitting the playlist listing.

When the controller 31 receives a request for video data from the video playback device 20, the controller 31 acquires the playlist corresponding to the requested video data from the video DB 32, and transmits the acquired playlist to the video playback device 20. Moreover, the controller 31 acquires, from the video DB 32, the split files sequentially requested by the video playback device 20 according to the playlist, and sequentially transmits the acquired split files to the video playback device 20.

The video playback device 20 functions as a display section that displays a video playback screen 60 (described in detail below), and as a video playback application that is installed to a user terminal provided with an input section for input of information. The user terminal is, for example, an information processing device such as a personal computer (PC), a notebook PC, a tablet terminal, or a smartphone.

As illustrated in FIG. 1, the video playback device 20 functionally includes an acquisition section 21 and a display controller 22. The display controller 22 is an example of a reception section and an adjustment section of technology disclosed herein.

The acquisition section 21 transmits the identification information (for example, the username) of the logged-in user to the video management device 30, and thereby acquires, from the video management device 30, the playlist listing of the video data permitted for distribution to the logged-in user, and passes the acquired playlist listing to the display controller 22. Moreover, the acquisition section 21 transmits, to the video management device 30, the playlist names for videos that have been selected from the playlist listing by the user, and thereby requests video data from the video management device 30, and acquires the playlist corresponding to that video data. Moreover, the acquisition section 21 issues sequential requests to the video management device 30 for split files in accordance with the acquired playlist, and sequentially acquires the split file from the video management device 30. The acquisition section 21 sequentially passes the acquired split file to the display controller 22.

Figure 2:
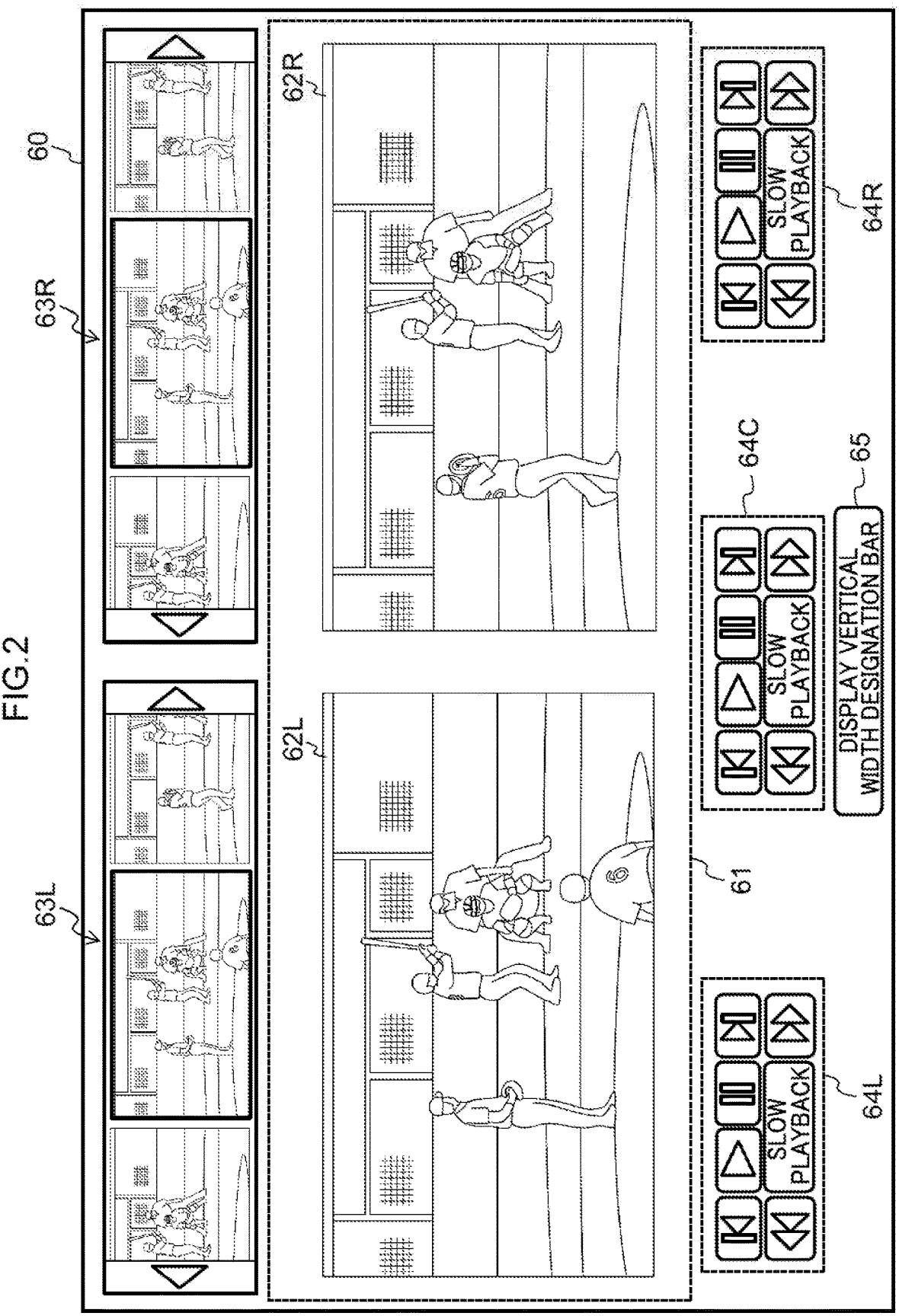
FIG. 2 is a diagram illustrating an example of a video playback screen of the first exemplary embodiment.

When the display controller 22 receives the playlist listing from the acquisition section 21, the display controller 22, for example, displays a video playback screen 60 like that illustrated in FIG. 2 on the display section. In the example of FIG. 2, plural videos can be played back in a video playback region 61 provided in the center of the video playback screen 60. Note that in the present exemplary embodiment, explanation is given regarding an example of a case in which two videos are played back. The video at the left side of the video playback screen 60 is referred to as a left video 62L and the video at the right side of the video playback screen 60 is referred to as a right video 62R. In states in which desired videos have not yet been selected from the playlist listing, neither a left video 62L nor a right video 62R is displayed on the video playback region 61.

The display controller 22 displays, in a specific region of the video playback screen 60, a left video playlist listing, 63L for selecting the left video 62L to play back, and a right video playlist listing 63R for selecting the right video 62R to play back. FIG. 2 illustrates an example in which thumbnail images of the videos represented by the respective playlists are displayed as the respective playlist listings 63L, 63R. The display controller 22 displays the respective playlist listings 63L, 63R in a state in which all of the thumbnail images can be checked by scrolling or the like. The display state of the playlist listing is not limited to cases employing thumbnail images as illustrated in FIG. 2. Playlist names included in the playlist listing may be displayed in a listing, or play-list names may be displayed together with the thumbnail images. When other metadata is also included in the playlist listing acquired from the video management device 30, that metadata may also be displayed together with the playlist listing.

When thumbnail images have been selected by operations such as double clicks or double taps that respectively correspond to the left video playlist listing 63L and the right video playlist listing 63R, the display controller 22 emphatically displays the selected thumbnails images. As the emphatic display, the display controller 22 can control display such that, for example, a border is thickened, size is increased, or brightness is increased. Moreover, the display controller 22 notifies the acquisition section 21 of the playlist name corresponding to the thumbnail image selected from the left video playlist listing 63L, and the playlist name corresponding to the thumbnail image selected from the right video playlist listing 63R.

Moreover, when the display controller 22 receives the split file from the acquisition section 21, the video corresponding to the thumbnail image that was selected from the left video playlist listing 63L is displayed in the video playback region 61 as the left video 62L. Moreover, the video corresponding to the thumbnail image that was selected from the right video playlist listing 63R is displayed in the video playback region 61 as the right video 62R.

In general methods for streaming playback of video using hypertext markup language (HTML), the position and size of a region where a video is to be played back is set in advance. In the present exemplary embodiment, control information regarding the display sizes and display positions of the respective left video 62L and the right video 62R is awaited, and the display controller 22 uses the control information to respectively dispose the left video 62L and the right video 62R at freely selected positions and at freely selected sizes in the video playback region 61. The display size, which is control information, is, for example, information respectively designating the widths and heights for the left video 62L and the right video 62R. The display position, which is control information, is information respectively designating x-coordinates and y-coordinates of freely selected points (for example, the top left corners) of the left video 62L and the right video 62R. Note that the x-coordinate and the y-coordinate may employ coordinate values of a coordinate system in which the rightward direction is set as the positive direction of the x-axis, and the downward direction is set as the positive direction of the y-axis, with the top left corner of the video playback region 61 serving as the origin.

The display controller 22 also displays a left video operation button group 64L for controlling playback of the left video 62L, and a right video operation button group 64R for controlling playback of the right video 62R, in specific regions of the video playback screen 60. The display controller 22 also displays a shared operation button group 64C for simultaneously controlling playback of the left video 62L and playback of the right video 62R. As operation buttons, each of the respective operation button groups 64L, 64C, 64R includes, for example, a rewind button, a play button, a pause button, a fast forward button, a previous-frame button, a slow playback button, and a next-frame button.

When an operation button of the left video operation button group 64L has been operated by the user, the display controller 22 controls playback of the left video 62L based on the button operated and the amount of operation. Moreover, when an operation button of the right video operation button group 64R has been operated by the user, the display controller 22 controls playback of the right video 62R based on the button operated and the amount of operation. Moreover, when an operation button of the shared operation button group 64C has been operated by the user, the display controller 22 controls playback of both the left video 62L and the right video 62R based on the button operated and the amount of operation. This not only enables respective control of playback of the left video 62L and the right video 62R, but also enables both of the videos 62L, 62R to be played back synchronized. For example, the left video 62L is paused at a desired timing, and the playback button of the shared operation button group MC is selected in a state in which a frame image of the right video 62R to be aligned with the timing of the paused frame image has been searched for using frame-by-frame advancing or the like and then displayed. This enables playback synchronized so as to match the playback timing of a desired frame image to be realized.

The display controller 22 also displays a display vertical width designation bar button 65 in a specific region of the video playback screen 60. Vertical width designation bars are marks for designating widths to serve as references for respectively adjusting the display sizes of the left video 62L and the right video 62R in the vertical direction. When the display vertical width designation bar button 65 has been selected, the display controller 22, for example, displays two left video vertical width designation bars 66L on the left video 62L and displays two right video vertical width designation bars 66R on the right video 62R, as illustrated in FIG. 3. The respective positions at which the vertical width designation bars 66L, 66R are displayed when the display vertical width designation bar button 65 has been selected may be predetermined initial positions (for example, positions at a quarter of the heights, and positions at three quarters of the heights of the respective left video 62L and right video 62R).

The display controller 22 also displays a left video vertical width designation bar position adjustment button 67L and a right video vertical width designation bar position adjustment button 67R in a specific region of the video playback screen 60. The respective vertical width designation position adjustment buttons 67L, 67R are buttons for instructing changes to the heights of respective vertical width designation bars 66L, 66R. For example, out of two left video vertical width designation bars 66L, the display controller 22 receives a selection of either one of the left video vertical width designation bars 66L by, for example, a click or tap operation. The display controller 22 then moves the display position of the selected left video vertical width designation bar 66L upward or downward by a specific amount of pixels (for example, 1 pixel) each time a button of the left video vertical width designation bar position adjustment button 67L indicating, the upward direction or the downward direction is selected. The display controller 22 also moves the display position for the right video vertical width designation bars 66R according to the selection of the right video vertical width designation bar position adjustment button 67R. Note that the respective vertical width designation bars 66L, 66R may be directly moved in the up-down direction by, for example, a dragging or swiping operation.

The display controller 22 receives the vertical direction separation between the two left video vertical width designation bars 66L as the width designated for the video 62L, and receives the vertical direction separation between the two right video vertical width designation bars 66R as the width designated for the video 62R.

Figure 4:
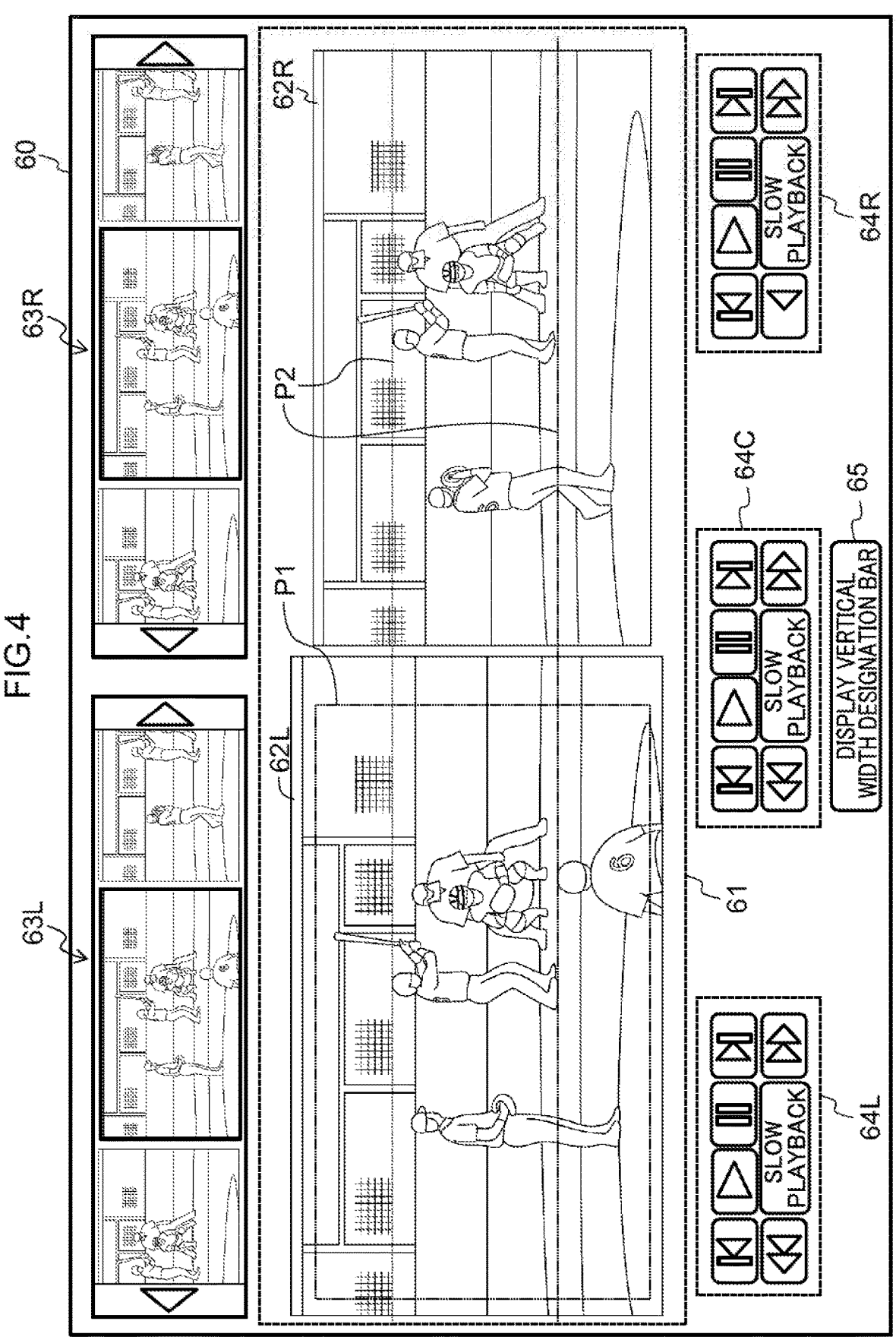
FIG. 4 is a diagram illustrating an example of a video playback screen with display sizes of two videos adjusted.

In place of the display vertical width designation bar button 65, the display controller 22 displays an execute display size adjustment button 68 in a specific region of the video playback screen 60. When the execute display size adjustment button 68 has been selected, the display controller 22 adjusts the display size of at least one out of the left video 62L or the right video 62R such that the display sizes of the widths designated within the respective videos 62L, 62R are equivalent, as illustrated in FIG. 4. FIG. 4 illustrates an example in which the display size of the left video 62L has been enlarged. The left video 62L prior to enlargement is indicated by the dotted line P1, and the positions where the designated respective vertical width designation bars 66L, 66R were displayed in the respective videos 62L, 62R are indicated by the dotted lines P2.

More specifically, the display controller 22 acquires information related to the widths designated in the respective videos 62L, 62R the current display positions and display sizes of the respective left video 62L and right video 62R, and the size of the video playback region 61. The display controller 22 derives an adjusted display size for at least one out of the left video 62L or the right video 62R based on the acquired information. For example, the display controller 22 denotes the width designated for the left video 62L as HL, denotes the width designated for the right video 62R as HR, and derives the post-adjustment display size of the left video 62L by multiplying the current display size of the left video 62L by HR/HL. The post-adjustment display size may be obtained by multiplying both the vertical direction and the horizontal direction by HR/HL, or by multiplying the vertical direction alone by HR/HL. The example of FIG. 4 illustrates an example obtained by enlarging both the vertical direction and the horizontal direction.

Moreover, the display controller 22 derives display positions for the videos 62L, 62R such that the positions of the vertical width designation bars 66L, 66R in the vertical direction designated for the respective videos 62L, 62R become the same position. The display positions of the respective videos 62L, 62R are not limited to cases in which the vertical width designation bars 66L, 66R are aligned at positions in the vertical direction, and display positions of the respective videos 62L, 62R may be derived such that the center positions of the respective videos 62L, 62R are at the vertical direction center within the video playback region 61. Moreover, the display positions of the respective videos 62L, 62R may be adjusted post-display size adjustment so that the respective videos 62L, 62R do not exceed the video playback region 61. Moreover, the display positions may employ the pre-display size adjustment display positions as-is, without any changes, and the following explanation therefore primarily focuses on adjustments to display size.

The display controller 22 updates the display size information included in the control information of the respective left video 62L and right video 62R to the display size derived as described above. The display controller 22 then changes the display size of at least one out of the left video 62L or the right video 62R based on the updated control information.

As described above, in the present exemplary embodiment, the left video 62L and the right video 62R can each be disposed in freely selected regions at freely selected sizes according to respective items of control information held for the left video 62L and the right video 62R. This enables the respective display sizes of the left video 62L and the right video 62R to be adjusted based on the widths in the vertical direction respectively designated for the videos 62L, 62R. Adjusting the display sizes of the videos in this manner can be realized using a combination of frameworks each capable of implementing precise functionality, rather than using a large, easy to handle framework such as that of a media player. For example, the functionality described above can be implemented using a combination of a framework for displaying videos, a framework for displaying lines, and a framework that detects operations such as touches, and the like. For example, the AVPlayer, AVPlayerItem layer of AVfoundation, which is a framework related to audio, can be employed as a framework for displaying videos on iOS (registered trademark).

Figure 5:
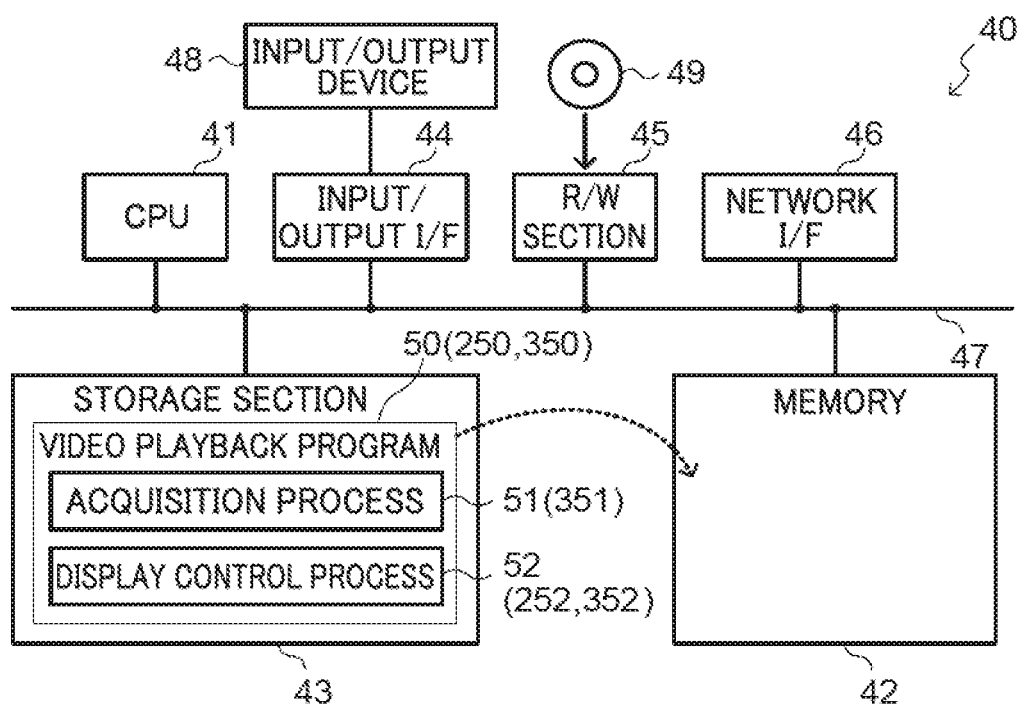
FIG. 5 is a block diagram illustrating a schematic configuration of a computer that functions as a video playback device according to the first to the third exemplary embodiment.

The video playback device 20 may, for example, be implemented by the computer 40 illustrated in FIG. 5. The computer 40 includes a CPU 41, memory 42 serving as a temporary storage region, and a non-volatile storage section 43. The computer 40 also includes an input/output interface (I/F) 11 to which input/output devices 48, such as a display device and an input device, are connected. The computer 40 also includes a read/write (R/W) section 45 for controlling reading and writing of data from and to a recording medium 49, and a network I/F 46 connected to a network such as the internet. The CPU 41, the memory 42, the storage section 43, the input/output I/F 44, the R/W section 45, and the network I/F 46 are connected to one another through a bus 47.

The storage section 43 may be implemented by a hard disk drive (HDD), a solid state drive (SSD), flash memory, or the like. A video playback program 50 that causes the computer 40 to function as the video playback device 20 is stored in the storage section 43, which serves as a storage medium. The video playback program 50 includes an acquisition process 51 and a display control process 52.

The CPU 41 reads the video playback program 50 from the storage section 43, expands the video playback program 50 into the memory 42, and sequentially executes the processes included in the video playback program 50. The CPU 41 operates as the acquisition section 21 illustrated in FIG. 1 by executing the acquisition process 51. The CPU 41 also operates as the display controller 22 illustrated in FIG. 1 by executing the display control process 52. The computer 40, which executes the video playback program 50, thereby functions as the video playback device 20.

The functionality implemented by the video playback program 50 can also be implemented by, for example, a semiconductor integrated circuit, and more specifically, by an application specific integrated circuit (ASIC).

Next, explanation follows regarding operation of the video playback system 10 according to the first exemplary embodiment.

In the video playback device 20, when the user has logged-in to the video playback application, the acquisition section 21 transmits the identification information (for example, the username) of the logged-in user to the video management device 30.

In the video management device 30, when the user identification information has been received, the controller 31 transmits, to the video playback device 20, a playlist listing of video data permitted for distribution to the logged-in user.

In the video playback device 20, the acquisition section 21 passes the acquired playlist listing to the display controller 22. The display controller 22, for example, displays a video playback screen 60 like that illustrated in FIG. 2 (the left video 62L and the right video 62R are not displayed).

When respective thumbnail images have been selected by the user from the left video playlist listing 63L and the right video playlist listing 63R, the display controller 22 emphatically displays the selected thumbnail images. The display controller 22 then notifies, to the acquisition section 21, the playlist name corresponding to the thumbnail image selected from the left video playlist listing 63L, and the playlist name corresponding to the thumbnail image selected from the right video playlist listing 63R. The acquisition section 21 then requests video data from the video management device 30 by transmitting the playlist names indicated by the respectively notified left video 62L and right video 62R to the video management device 30.

In the video management device 30, the controller 31 acquires the playlist corresponding to the requested video data from the video DB 32, and transmits the acquired playlist to the video playback device 20.

In the video playback device 20, the acquisition section 21 acquires the playlist, and sequentially requests the split files from the video management device 30 in accordance with the acquired playlist.

In the video management device 30, the controller 31 acquires the requested split files from the video DB 32, and sequentially transmits the acquired split files to the video playback device 20.

In the video playback device 20, the acquisition section 21 sequentially passes the acquired split files to the display controller 22. Then, when the display controller 22 has received the split files from the acquisition section 21, the left video 62L and the right video 62R are each played back in the video playback region 61. The respective display sizes and display positions of the left video 62L and the right video 62R are defined by the respective control information held for the left video 62L and right video 62R. Note that at this stage, a predetermined initial value is set in the control information. The display controller 22 then respectively controls playback of the left video 62L and the right video 62R based on operation of the operation buttons of the respective operation button groups 64L, 64C, 64R by the user.

Figure 6:
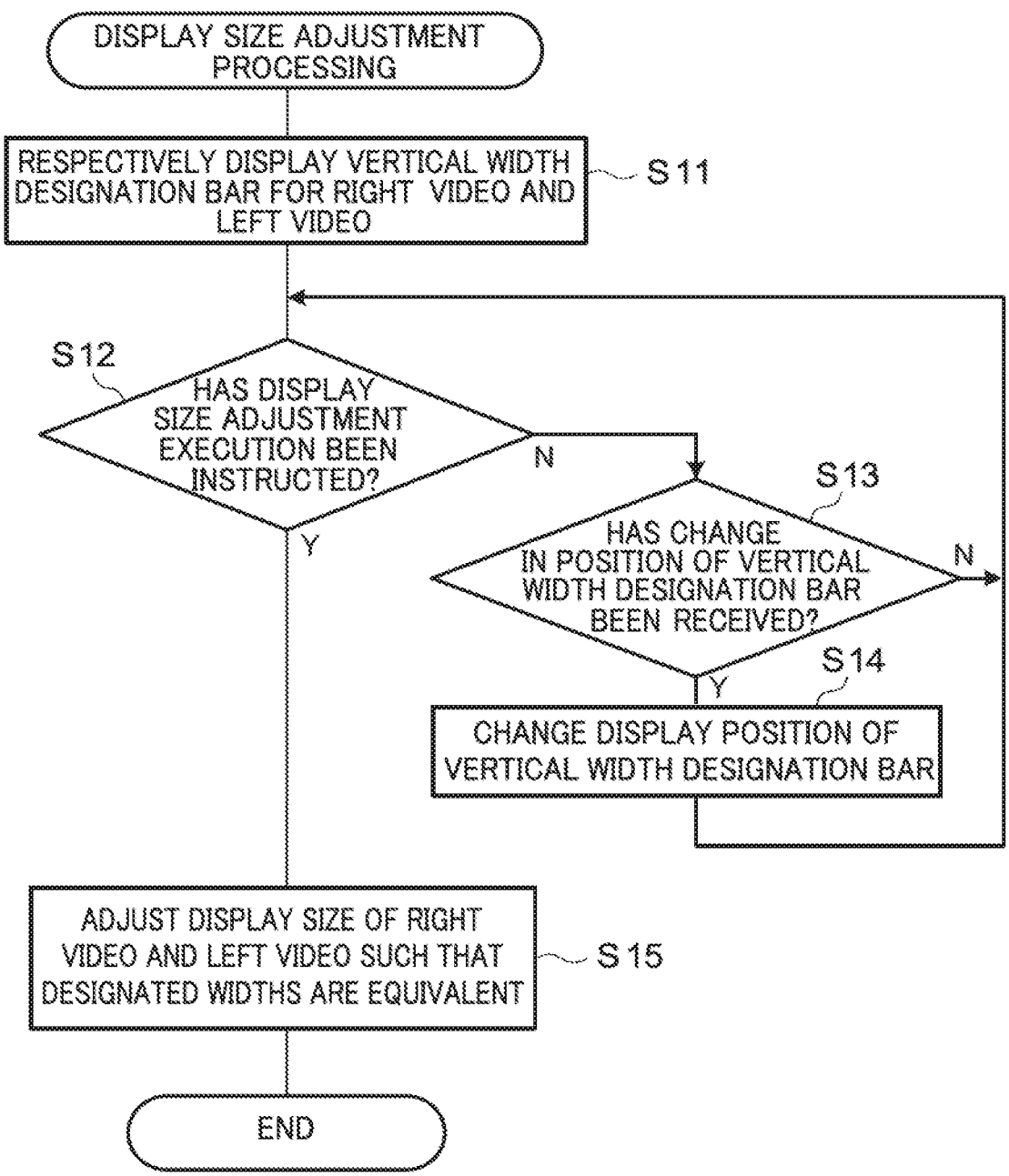
FIG. 6 is a flowchart illustrating an example of display size adjustment processing.

Then, in a state in which the video playback screen 60 is displayed with the display vertical width designation bar button 65 included, when the display vertical width designation bar button 65 is selected by the user, the display size adjustment processing illustrated in FIG. 6 is executed in the video playback device 20.

At step S11 of the display size adjustment processing, illustrated in FIG. 6, the display controller 22, for example, displays the left video vertical width designation bars 66L at predetermined initial positions on the left video 62L as illustrated in FIG. 3. Similarly, the display controller 22 displays the right video vertical width designation bars 66R at predetermined initial positions on the right video 62R.

Next, at step S12, the display controller 22 determines whether or not the execute display size adjustment button 68 has been selected by the user. Processing transitions to step S13 in cases in which the execute display size adjustment button 68 has not been selected.

At step S13, the display controller 22 determines whether or not a change in the position of either the left video vertical width designation bars 66L or the right video vertical width designation bars 66R has been received. For example, in cases in which either of the vertical width designation bar position adjusting buttons 67L, 67R have been selected, and in cases in which either of the vertical width designation bars 66L, 66R have been operated by dragging or swiping, the display controller 22 receives a change in the position of either of the horizontal bars 66L, 66R, and processing transitions to step S14. However, processing returns to step S12 in cases in which no change in position has been received.

At step S14, the display controller 22 changes the display position of the vertical width designation bars 66L, 66R such that the vertical width designation bars 66L, 66R are displayed at the position received at step S13 above, and processing returns to step S12.

At step S12, processing transitions to step S15 when the display controller 22 determines that the execute display size adjustment button 68 has been selected by the user. At step S15, the display controller 22, for example, as illustrated in FIG. 4, adjusts the display size of at least one out of the left video 62L or the right video 62R such that the display sizes of respective widths within the videos 62L, 62R designated by the respective vertical width designation bars 66L, 66R are equivalent. The display size adjustment processing then ends.

As explained above, in the video playback system 10 according to the first exemplary embodiment, the video playback device 20 adjusts the display sizes of the left video and the right video such that the widths in the vertical direction within both of the videos designated by the vertical width designation bars are equivalent. This facilitates comparison of the left video and the right video.

Figure 7:
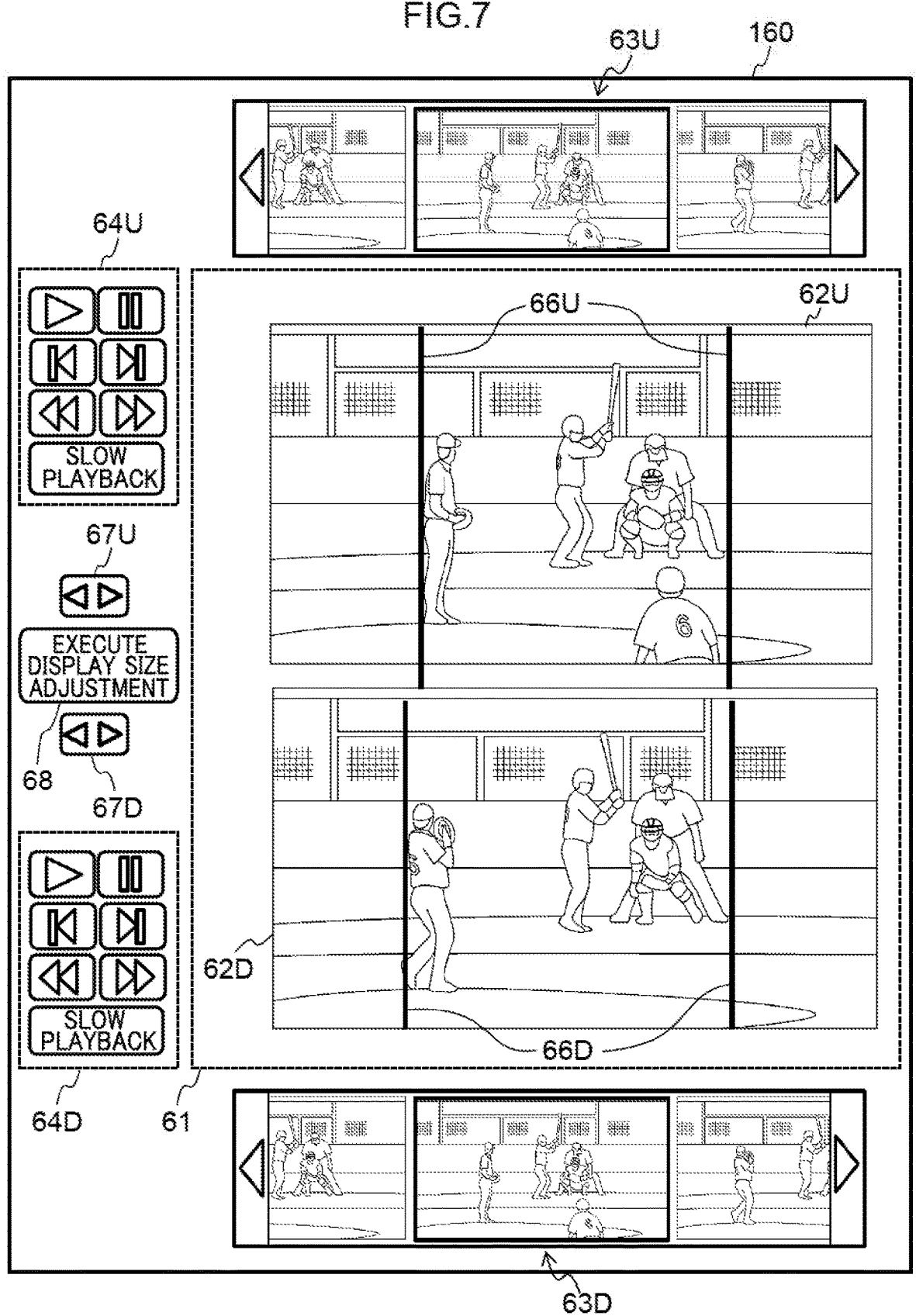
FIG. 7 is a diagram illustrating an example of a video playback screen on which a horizontal width designation bar is displayed.

Note that although explanation has been given in the first exemplary embodiment regarding a case in which the left video 62L right video 62R are disposed side-by-side in the horizontal direction and their display sizes are adjusted based on the widths designated in the vertical direction, there is no limitation thereto. For example, as illustrated in FIG. 7, configuration may be made such that an upper video 62U and a lower video 62D are disposed side-by-side in the vertical direction, designations of widths in the horizontal direction are received for the upper video 62U and the lower video 62D, and their display sizes are adjusted on a video playback screen 160. In the video playback screen 160, configuration similar to that of the respective configurations of the video playback screen 60 in FIG. 3 are allocated similar reference numerals with only the suffixes of the reference numerals changed from "L" or "R" to "U" or"D", and detailed explanation is omitted. Note that the reference numeral "U" is allocated to configuration related to the upper video 62U, and the reference numeral "D" is allocated to configuration related to the lower video 62D.

More specifically, when a display horizontal width designation bar button 165 (see also FIG. 8) provided to the video playback screen 160 has been selected, the display controller 22 displays two upper video horizontal width designation bars 66U on the upper video 62U. The display controller 22 also displays two lower video horizontal width designation bars 66D on the lower video 62D. Similarly to the vertical width designation bars 66L, 66R, the respective horizontal width designation bars 66U, 66D can be moved in the horizontal direction by operation of an upper video horizontal width designation bar position adjustment button 67U and a lower video horizontal width designation bar position adjustment button 67D. Moreover, the respective horizontal width designation bars 66U, 66D may also be moved in the horizontal direction directly by a dragging or swiping operation.

Figure 8:
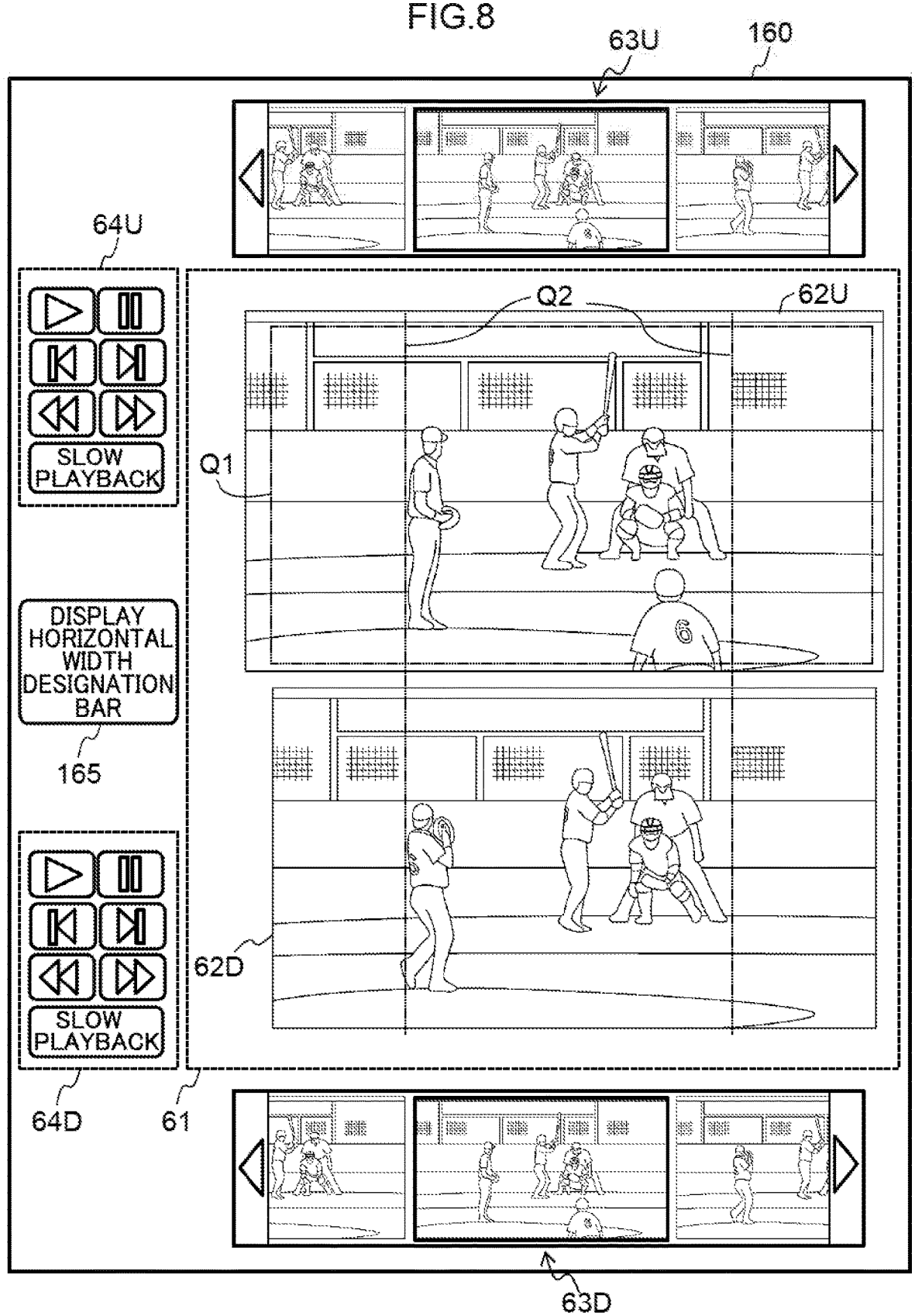
FIG. 8 is a diagram illustrating an example of a video playback screen with display sizes of two videos adjusted.

When an execute display size adjustment button 68 provided to the video playback screen 160 has been selected, the display controller 22 receives the horizontal direction separation between the two upper video horizontal width designation bars 66U as the width designated for the upper video 62U. The display controller 22 also receives the horizontal direction separation between the two respective lower video horizontal width designation bars 66D as the width designated for the lower video 62D. Then, as illustrated in FIG. 8, the display controller 22 adjusts the display size of at least one out of the upper video 62U or the lower video 62D such that the display sizes of respective horizontal direction widths within the videos 62L, 62R designated by the respective horizontal width designation bars 66U and 66D are equivalent. For example, the display controller 22 denotes the width designated for the upper video 62U as WU, denotes the width designated for the lower video 62D as WD, and derives the post-adjustment display size of the upper video 62U by multiplying the current display size of the upper video 62U by WD/WU. Note that FIG. 8 illustrates an example in which the display size of the upper video 62U has been enlarged. The upper video 62U prior to enlargement is indicated by the dotted line Q1, and the positions where the designated respective horizontal width designation bars 66U, 66D were displayed in the respective videos 62U, 62D are indicated by the dotted lines Q2.

This enables the display sizes of the upper video 62U and the lower video 62D to be adjusted based on the widths designated in the horizontal direction, similarly to in the case of adjusting the display sizes of the left video 62L and the right video 62R based on the widths designated in the vertical direction.

Moreover, after having their display sizes adjusted, the left video 62L and the right video 62R may, for example, be displayed superimposed such that the center positions of both of the videos 62L, 62R match each other, or such that positions designated by the user for the respective videos 62L, 62R, match each other. For example, one of the videos may be disposed at the center of the video playback region 61 post-display size adjustment, and the other video may be superimposed thereon post-display size adjustment after being set with transparency. Information related to the overlay sequence (which video is the video to be overlayed on), and the transparency setting can be held as control information of the respective videos 62L, 62R. Moreover, configuration may be made such that fine adjustments can be made to a superimposed display position so as to offset the display position of one video with respect to another video that has been superimposed onto the one video.

Second Exemplary Embodiment

Next, explanation follows regarding a video playback system according to a second exemplary embodiment. In the video playback system according to the second exemplary embodiment, portions similar to those of the video playback system 10 according to the first exemplary embodiment are allocated the same reference numerals, and detailed explanation thereof is omitted.

As illustrated in FIG. 1, a video playback system 210 according to the second exemplary embodiment includes a video playback device 220, and the video management device 30. The video playback device 220 and the video management device 30 are connected to each other through a network. As illustrated in FIG. 1, the video playback device 220 functionally includes the acquisition section 21 and a display controller 222. Note that the display controller 222 is an example of a reception section and an adjustment section of technology disclosed herein.

When the display controller 222 has received a playlist listing from the acquisition section 21, the display controller 222, for example, displays a video playback screen 260 like that illustrated in FIG. 9 on a display section. The video playback screen 260 includes a display designation frame button 265 instead of the display vertical width designation bar button 65 of the video playback screen 60 of the first exemplary embodiment. A designation frame is a frame for designating a region to serve as a reference for respectively adjusting the display sizes of the left video 62L and the right video 62R. When the display designation frame button 265 has been selected, the display controller 222, for example, displays a left video designation frame 266L on the left video 62L, and displays a right video designation frame 266R on the right video 62R, as illustrated in FIG. 10. The positions and sizes of the respective designation frames 266L, 266R displayed when the display designation frame button 265 has been selected may be predetermined initial positions and initial sizes (for example, at the respective centers of the left video 62L and the right video 62R, and at half the sizes of the respective videos 62L, 62R).

The display controller 222 also displays a left video designation frame adjustment button 267L and a right video designation frame adjustment button 267R in specific regions of the video playback screen 260. The respective designation frame adjustment buttons 267L, 267R are buttons for instructing changes to the size and position of the respective designation frames 266L, 266R. For example, each time a button of the respective designation frame adjustment buttons 267L, 267R indicating either the up, down, left, or right direction has been selected, the display controller 222 enlarges or reduces the selected area of the respective designation frame 266L, 266R by a specific amount of pixels (for example, one pixel) in the designated direction. Moreover, in cases in which a button of the respective designation frame adjustment buttons 267L, 267R indicating either the up, down, left, or right direction has been held down, the display controller 222 moves the position of the respective designation frame 266L, 266R in the designated direction according to how long the button was held down. Note that configuration may be made such that the respective designation frames 266L, 266R can be enlarged reduced, or moved directly by a dragging or swiping operation. Moreover, changes to the size of designation frames may be performed such that the vertical size and the lateral size can be changed separately, and the aspect ratio of designation frames may be fixed.

In place of the display designation frame button 265, the display controller 222 displays the execute display size adjustment button 68 in a specific region of the video playback screen 260. When the execute display size adjustment button 68 has been selected, the display controller 222 adjusts the display size of at least one out of the left video 62L or the right video 62R based on the designation frames 266L, 266R, as illustrated in FIG. 11. FIG. 11 illustrates an example in which the display size of the left video 62L has been enlarged. The designation frame 266L that was designated in the left video 62L prior to enlargement is indicated by the dotted line S1, and positions corresponding to the respective designation flames 266L, 266R in the respective videos 62L, 62R post-display size adjustment are indicated by the dotted lines S2.

For example, the vertical size of the designated left video designation frame 266L is denoted HL, the lateral size of the designated left video designation frame 266L is denoted WL, the vertical size of the designated right video designation frame 266R is denoted HR, and the lateral size of the designated right video designation frame 266R is denoted WR. The display controller 222 derives the post-adjustment display size of the left video 62L by multiplying the current display size of the left video 62L in the vertical direction by HR/HL, and by multiplying the current display size of the left video 62L in the horizontal direction by WR/WL. In cases in which the aspect ratios of the sizes of the designation frames 266L, 266R are fixed, the display sizes of the respective videos 62L, 62R can be derived by treating the vertical sizes of the designation frames 266L, 266R similarly to the widths designated for the respective videos 62L, 62R in the first exemplary embodiment.

The display controller 222 updates the display size information included in the control information of the respective left video 62L and the right video 62R to the display size derived as described above. The display controller 222 then changes the display size of at least one out of the left video 62L or the right video 62R based on the updated control information.

The video playback device 220 may, for example, be implemented by the computer 40 illustrated in FIG. 5. A video playback program 250 that causes the computer 40 to function as the video playback device 220 is stored in the storage section 43 of the computer 40. The video playback program 250 includes the acquisition process 51 and a display control process 252.

The CPU 41 reads the video playback program 250 from the storage section 43, expands the video playback program 250 into the memory 42, and sequentially executes the processes included in the video playback program 250. The CPU 41 operates as the acquisition section 21 illustrated in FIG. 1 by executing the acquisition process 51. The CPU 41 also operates as the display controller 222 illustrated in FIG. 1 by executing the display control process 252. The computer 40, which executes the video playback program 250, thereby functions as the video playback device 220.

The functionality implemented by the video playback program 250 can also be implemented by, for example, a semiconductor integrated circuit, and more specifically, by an ASIC or the like.

The operation of the video playback system 210 according to the second exemplary embodiment only differs from that of the first exemplary embodiment in that the designation frames 266L, 266R are employed as the reference for the display size adjustment, instead of the vertical width designation bars 66L, 66R, and explanation of the operation is therefore omitted.

As explained above, in the video playback system 210 according to the second exemplary embodiment, the video playback device 220 adjusts the display size of the left video and the right video such that the sizes of the regions designated by the designation frames within both videos are equivalent. This facilitates comparison of the left video and the right video.

Third Exemplary Embodiment

Next, explanation follows regarding a video playback system according to a third exemplary embodiment. In the third exemplary embodiment, explanation is given regarding a case in which display sizes of videos are shared between users. Note that in the video playback system according to the third exemplary embodiment, portions similar to those of the video playback system 10 according to the first exemplary embodiment are allocated the same reference numerals and detailed explanation thereof is omitted.

As illustrated in FIG. 1, a video playback system 310 according to the third exemplary embodiment includes a video playback device 320 and a video management device 330. The video playback device 320 and the video management device 330 are connected to each other through a network.

A controller 331 of the video management device 330 controls distribution of video data to the video playback device 320, similarly to the controller 31 of the first exemplary embodiment. Additionally, the controller 331 manages shared information for sharing the display sizes of videos between users. The shared information includes a username, two playlist names, and information related to display sizes and display positions of videos indicated by the respective playlists, and this is explained in more detail below. Hereafter, the user at the side registering the shared information to the video management device 330 is sometimes referred to as the "transmission side user", and the user at the side using the shared information managed by the video management device 330 to play back the videos is sometimes referred to as the "reception side user".

More specifically, the controller 331 receives the shared information transmitted from the video playback device 320 due to instruction from the transmission side user. The controller 331 holds, for example, a shared information table 332A like that illustrated in FIG. 12 in a video DB 332 that stares plural items of video data and the respective playlists of the video data, and the controller 331 manages the received shared information. In the example of FIG. 12, each row corresponds to one item of shared information. Moreover, "playlist 1" and "playlist 2" are two respective playlist names included in the shared information. Note that in the third exemplary embodiment also, video playback can be performed in the video playback device 320 in a state in which the left video 62L and the right video 62R are aligned, similarly to in the first exemplary embodiment. The two playlist names are therefore the playlist name of the left video 62L and the playlist name of the right video 62R, respectively. However, since both of the videos 62L, 62R are identifiable as either the left video 62L or the right video 62R based on the display position, there is no need to specify which out of the left video 62L and the right video 62R the playlist 1 or playlist 2 corresponds to.

The controller 331 also manages the shared information for each transmission side user. When shared information is registered in the shared information table 332A, the controller 331 allocates, to each item of shared information, a number for identifying the item of shared information for each username as a "user-distinct shared information number".

Figure 13:
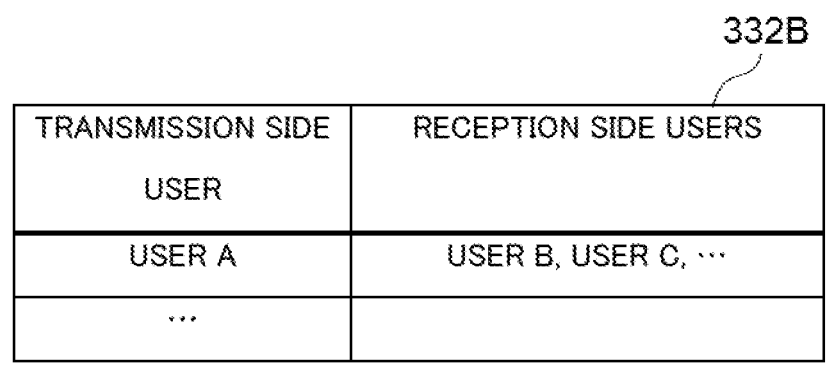
FIG. 13 is a diagram illustrating an example of a sharing user table.

As illustrated in FIG. 13, for each user, shared information transmitted by that user when they are the transmission side user is also stored in a sharing user table 332B in the video DB 332 in association with identification information for example, usernames) of users that are capable of using the shared information as reception side users. The sharing user table 332B may be preregistered when application use is registered, and usernames of users capable of using the shared information may be included in the shared information and registered when the shared information has been received by the controller 331.

When shared information usable by a logged-in user is present, the controller 331 notifies this to the video playback device 320 in addition to transmitting the playlist listing of the video data permitted for distribution to the logged-in user. More specifically, the controller 331 references the sharing user table 332B, searches the "reception side user" column for usernames of logged-in users, and acquires the usernames of corresponding transmission side users. In cases in which shared information being managed in association with an acquired username is present in the shared information table 332A, the controller 331 then determines that shared information usable by a logged-in user is present in the shared information table 332A.

Moreover, when the controller 331 has received a request for a share list (described in detail below) from the video playback device 320, the controller 331 acquires shared information usable by the logged-in user from the shared information table 332A, and transmits a share list listing the acquired shared information to the video playback device 320. At least the usernames and the user-distinct shared information numbers for each item of shared information are included in the share list. Other than the above information included in the shared information, metadata a thumbnail image, and the like of video data indicated by the playlist name included in each item of shared information may also be included in the shared information.

Moreover, when the controller 331 has received a request for a shared video from the video playback device 320, the controller 331 acquires shared information for the requested video, and the two playlists respectively indicated by the two playlist names included in the shared information, from the video DB 332. The controller 331 then transmits the acquired shared information and playlists to the video playback device 320.

As illustrated in FIG. 1, the video playback device 320 functionally includes an acquisition section 321 and a display controller 322. Note that the display controller 322 is an example of a reception section and an adjustment section of technology disclosed herein.

Similarly to the acquisition section 21 of the first exemplary embodiment, the acquisition section 321 acquires video data from the video management device 330. Additionally, the acquisition section 321 transmits the shared information to the video management device 330 according to instruction by the transmission side user.

The acquisition section 321 also acquires video data shared from the video management device 330, according to instruction by the reception side user. More specifically, when a user has logged-in, in cases in which a notification has been received from the video management device 330 stating that shared information usable by the logged-in user is present, the acquisition section 321 notifies this to the display controller 322. Moreover, when a notification (described in detail below) has been made from the display controller 322 stating that a display share list button has been selected, the acquisition section 321 requests a share list from the video management device 330. The acquisition section 321 also passes the share list received corresponding to the request to the display controller 322. Moreover, when the display controller 322 has notified the acquisition section 321 of a username and a user-distinct shared information number of shared information selected from the share list (this is described in more detail below), the acquisition section 321 requests the shared video by transmitting the username and the user-distinct shared information number to the video management device 330. The acquisition section 321 then acquires the shared information and the playlist received corresponding to the request, sequentially acquires the split files from the video management device 330 according to the playlist, and passes the acquired split files to the display controller 322 together with the shared information.

Similarly to the display controller 22 of the first exemplary embodiment, the display controller 322 displays a video playback screen on the display section, and performs display size adjustment on the left video 62L and the right video 62R. Additionally, the display controller 322, for example, displays a share button 71 on a video playback screen 360 after having performed display size adjustment on the left video 62L and the right video 62R, as illustrated in FIG. 14. When the share button 71 has been selected, the display controller 322 acquires the respective playlist names of the left video 62L and the right video 62R from the playlist listing during playback, and acquires information related to the display sizes and display positions from the respective control information held by the videos 62L, 62R. The display controller 322 appends the identification information (for example, the username) of the logged-in user to the acquired respective playlist names of the left video 62L and right video 62R and to the information related to the display sizes and display positions, and passes this to the acquisition section 321 as the shared information.

Moreover, when the display controller 322 has been notified by the acquisition section 321 that shared information usable by the logged-in user is present, the display controller 322 displays the display share list button 72 on the video playback screen 360, as illustrated in FIG. 15. When the display share list button 72 has been selected, the display controller 322 notifies this to the acquisition section 321.

Figure 16:
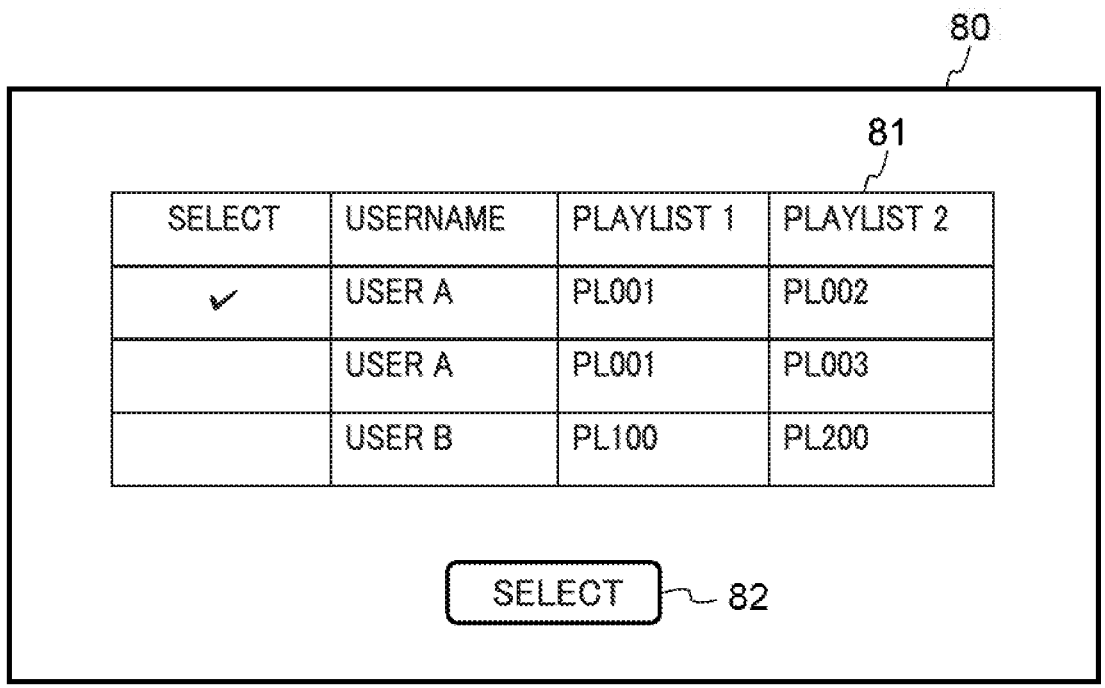
FIG. 16 is a diagram illustrating an example of a sharing list screen.

When the display controller 322 has received the share list from the acquisition section 321, the display controller 322 also displays, for example, a share list screen 80 like that illustrated in FIG. 16. The share list screen 80 may be displayed by switching from video playback screen 360, or may be displayed superimposed over the video playback screen 360. In the example of FIG. 16, the share list screen 80 includes a share list 81 and a select button 82. Each row of the share list 81 corresponds to one item of shared information and each row is displayed in a selectable state. Moreover, each row of the share list 81 is linked to at least a username and a user-distinct shared information number, and selecting at least one row from the share list 81 causes the shared information specified by the username and user-distinct shared information number linked to that row to be selected. In the example of FIG. 16, a case is illustrated in which the items included in the share list 81 are the username, playlist 1, and playlist 2; however, there is no limitation thereto. In cases in which metadata, a thumbnail image, and the like of the video data indicated by each playlist name is included in the share list acquired from the video management device 330, this information may also be displayed.

When the select button 82 has been selected in a state in which at least one row has been selected from the share list 81, the display controller 322 notifies, to the acquisition section 321, the username and the user-distinct shared information number linked to the row selected in the share list 81. The display controller 322 also closes the share list screen 80 and retains to displaying the video playback screen 360.

Moreover, when the display controller 322 has received the shared information together with the split files from the acquisition section 321, the display controller 322 sets, in the control information of the video represented by the split files, the information related to the display size and display position included in the shared information. More specifically, for example, in a case in which the shared information in the first row of the shared information table 332A illustrated in FIG. 12 has been received, the width in the horizontal direction is set to W1, the width in the vertical direction is set to H1, and (x1, y1) is set as the display position included in the control information of the video represented by the split files acquired in accordance with playlist 1. Similarly, the width in the horizontal direction is set to W2, the width in the vertical direction is set to H2, and (x2, y2) is set as the display position included in the control information of the video represented by the split files acquired in accordance with playlist 2. When the reception side user plays back the videos, the display controller 322 can display the videos with the same display sizes and display positions as those of the video playback screen 360 when the transmission side user selected the share button 71 by disposing the respective videos 62L, 62R at display sizes in accordance with the control information.

The video playback device 320 may, for example, be implemented by the computer 40 illustrated in FIG. 5. A video playback program 350 that causes the computer 40 to function as the video playback device 320 is stored in the storage section 43 of the computer 40. The video playback program 350 includes an acquisition process 351 and a display control process 352.

The CPU 41 reads the video playback program 350 from the storage section 43, expands the video playback program 350 into the memory 42, and sequentially executes the processes included in the video playback program 50. The CPU 41 operates as the acquisition section 321 illustrated in FIG. 1 by executing the acquisition process 351. The CPU 41 also operates as the display controller 322 illustrated in FIG. 1 by executing the display control process 352. The computer 40, which executes the video playback program 350, thereby functions as the video playback device 320.

Note that the functionality implemented by the video playback program 350 can also be implemented by, for example, a semiconductor integrated circuit, and more specifically, by an ASIC or the like.

Next, explanation follows regarding operation of the video playback system 310 according to the third exemplary embodiment. In the third exemplary embodiment, processing other than processing that shares display positions of videos between users is similar to that of the first exemplary embodiment, and explanation therefore follows regarding the processing to share the display positions of videos between users.

After first explaining a flow of processing for exchanges between a video playback device 320A operated by the transmission side user, the video management device 330, and a video playback device 320B operated by the reception side user, explanation follows regarding details of processing executed by each of these devices. Note that it is convenient to treat the video playback device 320A and video playback device 320B as being distinct for the sake of explaining differences in behavior between the transmission of shared information and the use of shared information, but this does not imply that these devices are configured differently from each other.

Figure 17:
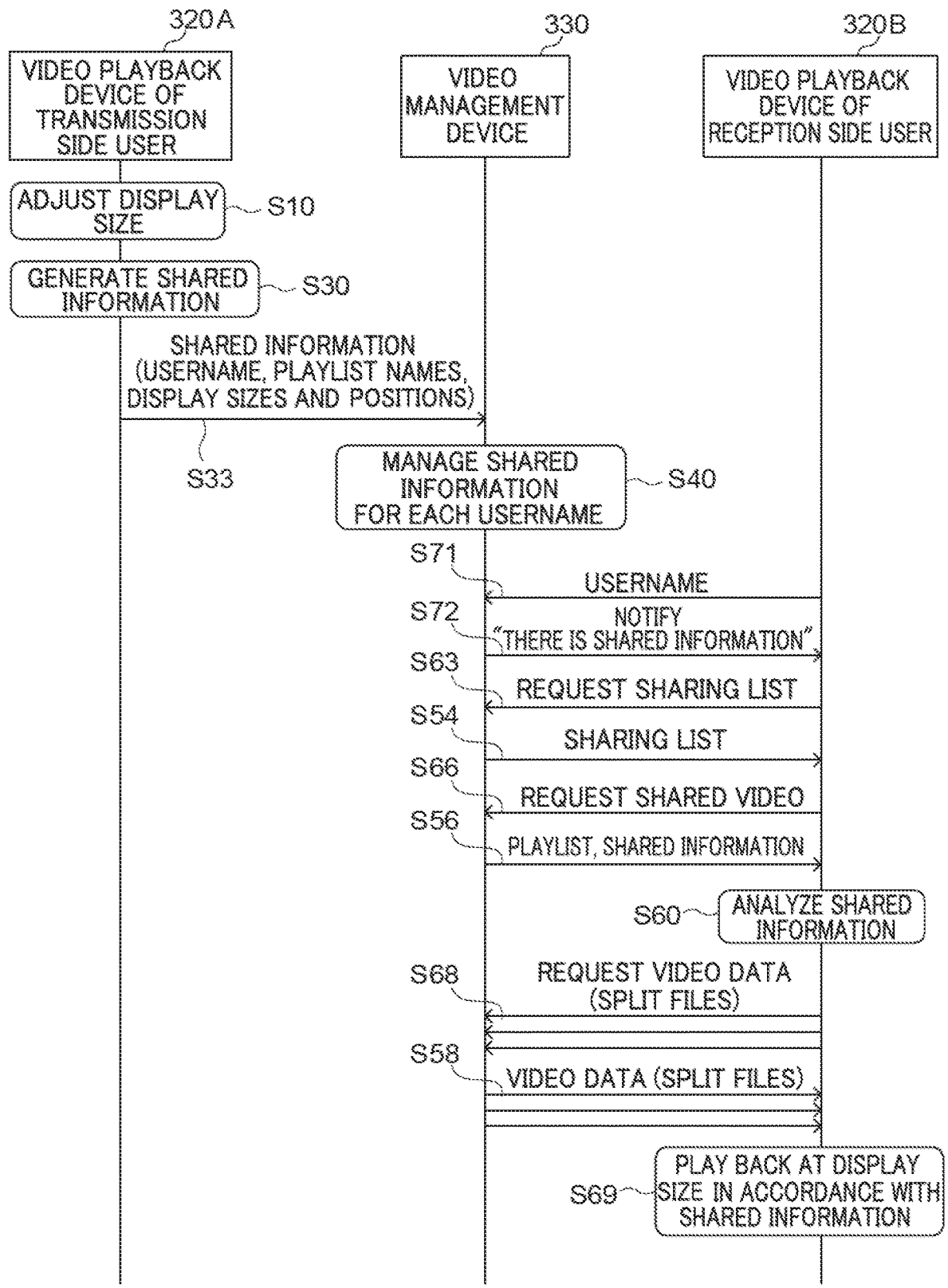
FIG. 17 is a sequence diagram representing a flow of processing for exchange between a transmission side user video playback device, a video management device, and a reception side user video playback device.

FIG. 17 illustrates a sequence chart representing a flow of processing for exchanges between the video playback device 320A, the video management device 330, and the video playback device 320B. In the video playback device 320A, the display size adjustment processing for the left video 62L and the right video 62R (S10) is, for example, executed similarly to the display size adjustment processing of the first exemplary embodiment (FIG. 6). When the share button 71 has been selected from the video playback screen 360 in this state, the display controller 322 generates shared information (S30) and transmits the shared information to the video management device 330 (S33). The received shared information is managed in the video management device 330 (S40).

Due to a user logging in to the video playback device 320B, the username of the logged-in user is transmitted from the video playback device 320B to the video management device 330 (S71). In cases in which shared information usable by the logged-in user is present, the video management device 330 notifies this to the video playback device 320B (S72). When this notification has been received and the share list has been requested by the video playback device 320B (S63), the share list is transmitted from the video management device 330 (S54). The video playback device 320B then makes a request to the video management device 330 for the shared video (S66). The video management device 330 transmits, to the video playback device 320B, shared information for the requested video and the playlists indicated by the playlist names included in the shared information (S56).

In the video playback device 320B, the acquired shared information is analyzed, and the username, the respective playlist names, and illumination related to the display sizes and display positions of the videos indicated by the respective playlist names are extracted. The video playback device 320B also makes sequential requests to the video management device 330 for the split files in accordance with the acquired playlist (S68). The video management device 330 sequentially transmits the split files to the video playback device 320B in accordance with the requests (S73). In the video playback device 320B, the display sizes and display positions of the videos represented by the acquired split files are controlled according to the information related to the display sizes and display positions included in the shared information, and the videos are played back (S69).

Explanation follows regarding processing executed by the video playback device 320A, the video management device 330, and the video playback device 320B, respectively. In each processing, steps that perform processing similar to processing explained with reference to FIG. 17 are allocated the same reference numerals.

Figure 18:
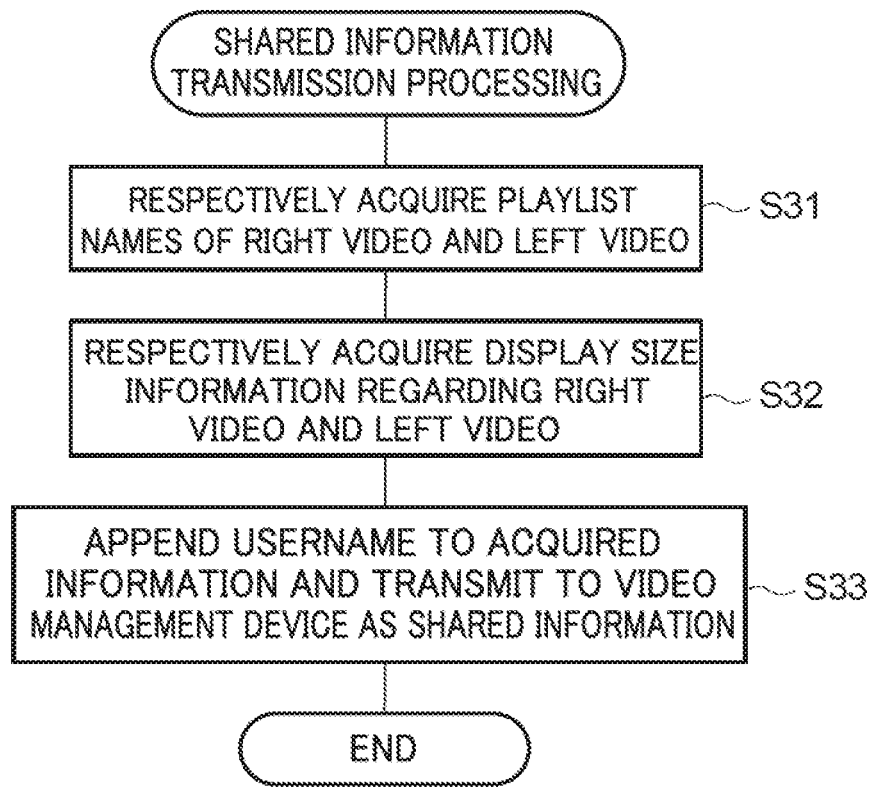
FIG. 18 is a flowchart illustrating an example of shared information transmission processing.

First, in the video playback device 320A, when the share button 71 displayed by the video playback screen 360 has been selected, the shared information transmission processing illustrated in FIG. 18 is executed.

At step S31, the display controller 322 acquires the respective playlist names for the left video 62L and the right video 62R during playback, from the playlist listing received from the acquisition section 321. Next, at step S32, the display controller 322 acquires information related to the display sizes and display positions of the respective videos 62L, 62R from the respective control information of the left video 62L and the right video 62R. Next, at step S33, the display controller 322 appends the identification information of the logged-in user (for example, their username) to the acquired two playlist names and the information related to the display sizes and the display positions, and this is passed to the acquisition section 321 as the shared information. The acquisition section 321 then transmits the shared information to the video management device 330 and then ends the shared information transmission processing.

Figure 19:
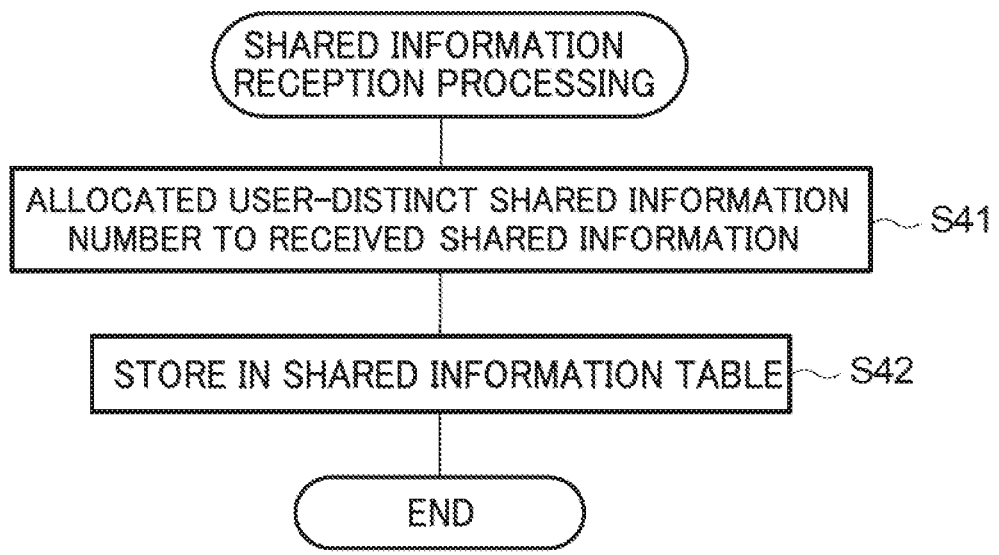
FIG. 19 is a flowchart illustrating an example of shared information reception processing.

Next, in the video management device 330, when the shared information transmitted from the video playback device 320A has been received, the shared information reception processing illustrated in FIG. 19 is executed.

At step S41, the controller 331 allocates a user-distinct shared information number to the received shared information. Next, at step S42, the controller 331 stores the shared information allocated with the user-distinct shared information number in the shared information table 332A of the video DB 332, and then ends the shared information reception processing.

Figure 20:
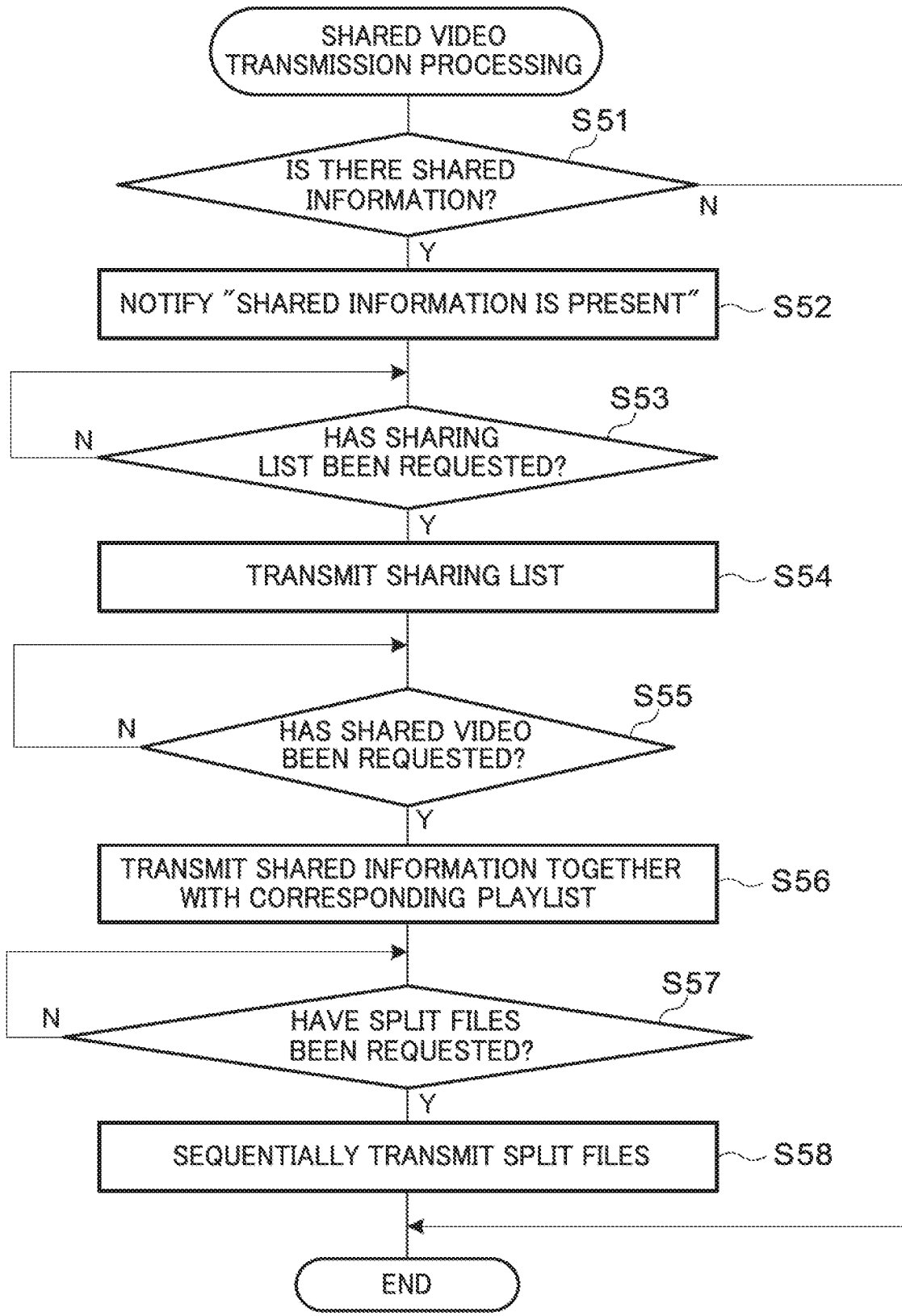
FIG. 20 is a flowchart illustrating an example of shared video transmission processing.

Moreover, in the video playback device 320B, when a username transmitted from the video playback device 320B due to a user logging in has been received by the video management device 330, the shared video transmission processing illustrated in FIG. 20 is executed by the video management device 330.

At step S51, the controller 331 references the sharing user table 332B and the shared information table 332A of the video DB 332, and determines whether or not shared inhumation usable by the logged-in user is present. In cases in which shared information usable by the logged-in user is present, processing transitions to step S52, and the video playback device 320B is notified that shared information usable by the logged-in user is present. However, in cases in which no shared information usable by the logged-in user is present, the shared video transmission processing ends.

Next, at step S53, the controller 331 determines whether or not a request for a share list from the video playback device 320B has been received. Processing transitions to step S54 in cases in which a request for a share list has been received, or the determination of the current step is repeated in cases in which a request for a share list has not been received.

At step S54, the controller 331 acquires shared information usable by the logged-in user from the shared information table 332A, and transmits the share list listing the acquired shared inhumation to the video playback device 320B.

Next, at step S55, the controller 331 determines whether or not a request from the video playback device 320B for shared videos has been received. Processing transitions to step S56 in cases in which a request for shared videos has been received, or the determination of the current step is repeated in cases in which a request for shared videos has not been received.

At step S56, the controller 331 acquires, from the video DB 332, shared information for the requested videos and the two playlists respectively indicated by the two playlist names included in the shared information, and transmits these to the video playback device 320B.

Next, at step S57, the controller 331 determines whether or not a request from the video playback device 320B for split files has been received. Processing transitions to step S58 in cases in which a request for split files has been received, or the determination of the current step is repeated in cases in which a request for split files has not been received.

At step S58, the controller 331 acquires the requested split files from the video DB 332, sequentially transmits the acquired split files to the video playback device 320B, and then the shared video transmission processing ends.

However, when a notification has been made from the video management device 330 to the video playback device 320B stating that shared information usable by the logged-in user is present, the shared video playback processing illustrated in FIG. 21 is executed in the video playback device 320B.

At step S61, the acquisition section 321 notifies the display controller 322 that shared information usable by the logged-in user is present, and having received this notification, the display controller 322 displays the display share list button 72 on the video playback screen 360.

Next, at step S62, the display controller 322 determines whether or not the display share list button 72 has been selected by the user. Processing transitions to step S63 in cases in which the display share list button 72 has been selected, or the determination of the current step is repeated in cases in which the display share list button 72 has not been selected.

At step S63, the display controller 322 notifies the acquisition section 321 that the display share list button 72 has been selected, and having received the notification, the acquisition section 321 makes a request to the video management device 330 for the share list. Next, at step S64, the acquisition section 321 acquires the share list transmitted from the video management device 330 according to the request, and passes the acquired share list to the display controller 322. The display controller 322, for example, displays a share list screen 80 like that illustrated in FIG. 16.

Next, at step S65, in a state in which at least one row has been selected from the share list 81 of the share list screen 80, the display controller 322 determines whether or not shared information has been selected by the user by determining whether or not the select button 82 has been selected. Processing transitions to step S66 in cases in which shared information has been selected, or the determination of the current step is repeated in cases in which shared information has not been selected.

At step S66, the display controller 322 notifies, to the acquisition section 321, the username and the user-distinct shared information number linked to the row selected in the share list 81. Having received the notification, the acquisition section 321 makes a request to the video management device 330 for the shared videos. The display controller 322 also closes the share list screen 80 and returns to displaying the video playback screen 360.

Next, at step S67, the acquisition section 321 acquires the shared information and the playlist transmitted from the video management device 330 according to the request. Next, at step S68, the acquisition section 321 sequentially acquires the split files from the video management device 330 in accordance with the playlist, and passes the acquired split files to the display controller 322 together with the shared information acquired at step S67 above.

Next, at step S69, the display controller 322 sets, in the control information of the videos represented by the acquired split files, the information related to the display sizes and display positions included in the shared information, disposes and plays back the respective videos 62L, 62R at display sizes that accord with the control information, and ends the shared video playback processing.

As explained above, in the video playback system 310 according to the third exemplary embodiment, the video playback device 320 transmits, to the video management device 330, information regarding the respective display sizes of the left video and the right video after display size adjustment was performed, and this information is managed as the shared information in the video management device 330. Then, when the shared videos are played back, in the video playback device 320, the shared information is also acquired together with the playlist, and the display sizes of the videos are determined in accordance with the display sizes indicated by the shared information. This enables a user who has compared plural videos to share the display size for each video with another user such that playback is performed at the same display size, without using editing tools or the like to generate and store new videos in the display-size-adjusted state.

Explanation has been given regarding a case in which display sizes and display positions of videos are shared in the third exemplary embodiment. However, in cases in which the shared operation button group 64C is operated and two video playback timings are synchronized by the transmission side user, this synchronization state may also be shared. In such cases, information for specifying respective frame images of the left video 62L and the right video 62R being displayed at the timing when the share button 71 was selected may be acquired (for example, timestamps or frame numbers), and this information may be included in the shared information. When shared videos are played back by the reception side user, the playback timing of the left video 62L and the right video 62R may be controlled such that frame images of the left video 62L and frame images of the right video 62R specified by information such as timestamps included in the shared information are displayed at the same timing.

Moreover, in cases in which both videos have been displayed superimposed after the display sizes of the left video and the right video have been adjusted information related to, for example, the transparency setting of the superimposed video, may be managed as shared information together with the information related to the display size and display position of each of the videos.

In each of the exemplary embodiments above, explanation has been given regarding cases in which split files obtained by splitting a single item of video data at specific time intervals are sequentially acquired and played back in accordance with a playlist, namely, cases in which the subject is video data managed while split into plural segments; however, there is no limitation thereto. For example, video data managed with each segment as an individual file could be the subject, as in MPEG-4. In such cases, the filename of each file may be included in the shared information in place of the playlist name.

Although explanation has been given regarding examples of cases in which two videos are compared in each of the exemplary embodiments above, technology disclosed herein may also be applied when comparing three or more videos.

Although the drawings illustrate cases in which baseball videos are played back in each of the exemplary embodiments above, the videos that are made the subject may be videos of another sport such as tennis or golf, or may be videos other than sports videos. Although technology disclosed herein is particularly applicable to videos captured in similar settings, technology disclosed herein is also applicable to comparisons of videos created with, for example, slight differences in camera angle. For example, in the case of baseball videos, although compositions captured in the direction of the batter from behind the pitcher are often included, subtle discrepancies may arise in such compositions due to differences between stadiums and broadcasters and the like, and even if the compositions are similar, the size at which objects of the same size (such as pitchers) are captured in videos may be different. Even in cases in which such videos are compared, comparison of the videos is facilitated as long as the display sizes can be adjusted as in each of the exemplary embodiments above. For example, even in cases of comparing the motions of pitchers with difference stances, comparison of the videos can be facilitated as long as the display size is adjustable as in each of the exemplary embodiments above.

Although explanation was given above regarding a mode in which the video playback program 50, 250, 350 was pre-stored (installed) to the storage section 43, there is no limitation thereto. The program according to technology disclosed herein may be provided in a mode recorded onto a recording medium such as a CD-ROM, DVD-ROM, or USB memory.

An aspect of technology disclosed herein enables comparison of plural videos to be facilitated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing a video playback program that causes a computer to execute a process, the process comprising:
    displaying a plurality of videos in a plurality of display regions within a screen, respectively, each of the plurality of videos including control information for controlling a display position and a display size of a display region for the each of the plurality of videos within the screen;
    for each of the displayed plurality of videos, receiving designations of widths in a vertical direction or in a horizontal direction within each of the plurality of display regions displaying the plurality of videos; and
    adjusting relative display sizes of the plurality of videos such that display sizes of the widths designated for each of the plurality of videos are equivalent by updating the control information of the plurality of videos according to the received designations, and separately displaying on the screen the display regions of the plurality of videos with the adjusted sizes.

2. The non-transitory recording medium of claim 1, wherein, in the process, the designations of the widths are received during playback of each of the plurality of videos.

3. The non-transitory recording medium of claim 1, wherein, in the process:
    receiving the designations of the widths in the vertical direction or in the horizontal direction includes receiving designations of specific regions within the display regions of each of the plurality of videos; and
    adjusting the relative display sizes of the plurality of videos includes adjusting such that the display sizes of the widths in a vertical direction and a horizontal direction of the specific regions designated for the plurality of videos are equivalent.

4. The non-transitory recording medium of claim 1, wherein the process further comprises, for each of the plurality of videos, storing information on the adjusted display sizes in a storage section.

5. A video playback device, comprising:
    a processor configured to execute a process, the process comprising:
    displaying a plurality of videos in a plurality of display regions within a screen, respectively, each of the plurality of videos including control information for controlling a display position and a display size of a display region for the each of the plurality of videos within the screen;
    for each of the displayed plurality of videos, receiving designations of widths in a vertical direction or in a horizontal direction within each of the plurality of display regions displaying the plurality of videos; and
    adjusting relative display sizes of the plurality of videos such that display sizes of the widths designated for each of the plurality of videos are equivalent by updating the control information of the plurality of videos according to the received designations, and separately displaying on the screen the display regions of the plurality of videos with the adjusted sizes.

6. The video playback device of claim 5, wherein, in the process, the designations of the widths are received during playback of each of the plurality of videos.

7. The video playback device of claim 5, wherein, in the process:
    receiving the designations of the widths in the vertical direction or in the horizontal direction includes receiving designations of specific regions within the display regions of each of the plurality of videos; and
    adjusting the relative display sizes of the plurality of videos includes adjusting such that the display sizes of the widths in a vertical direction and a horizontal direction of the specific regions designated for the plurality of videos are equivalent.

8. The video playback device of claim 5, wherein the process further comprises, for each of the plurality of videos, storing information on the adjusted display sizes in a storage section.

9. A video playback method, comprising:
    displaying a plurality of videos in a plurality of display regions within a screen, respectively, each of the plurality of videos including control information for controlling a display position and a display size of a display region for the each of the plurality of videos within the screen;
    for each of the displayed plurality of videos, receiving designations of widths in a vertical direction or in a horizontal direction within each of the plurality of display regions displaying the plurality of videos; and
    by a processor, adjusting relative display sizes of the plurality of videos such that display sizes of the widths designated for each of the plurality of videos are equivalent by updating the control information of the plurality of videos according to the received designations, and separately displaying on the screen the display regions of the plurality of videos with the adjusted sizes.

10. The video playback method of claim 9, wherein the designations of the widths are received during playback of each of the plurality of videos.

11. The video playback method of claim 9, wherein:
    receiving the designations of the widths in the vertical direction or in the horizontal direction includes receiving designations of specific regions within the display regions of each of the plurality of videos; and adjusting the relative display sizes of the plurality of videos includes adjusting such that the display sizes of the widths in a vertical direction and a horizontal direction of the specific regions designated for the plurality of videos are equivalent.

12. The video playback method of claim 9, further comprising, for each of the plurality of videos, storing information on the adjusted display sizes in a storage section.

* * * * *